US010031294B2

(12) United States Patent
Zhang et al.

(10) Patent No.: US 10,031,294 B2
(45) Date of Patent: Jul. 24, 2018

(54) OPTICAL SWITCH AND WAVELENGTH DIVISION MULTIPLEXING OPTICAL SYSTEM

(71) Applicant: Huawei Technologies Co., Ltd., Shenzhen (CN)

(72) Inventors: Chunhui Zhang, Wuhan (CN); Peng Zhang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 164 days.

(21) Appl. No.: 15/360,642

(22) Filed: Nov. 23, 2016

(65) Prior Publication Data

US 2017/0075074 A1    Mar. 16, 2017

Related U.S. Application Data

(63) Continuation of application No. PCT/CN2014/095613, filed on Dec. 30, 2014.

(30) Foreign Application Priority Data

May 27, 2014    (CN) .......................... 2014 1 0228121

(51) Int. Cl.
*G02B 6/35* (2006.01)
*G02B 26/08* (2006.01)
(Continued)

(52) U.S. Cl.
CPC ............. *G02B 6/3518* (2013.01); *G02B 6/35* (2013.01); *G02B 6/352* (2013.01); *G02B 6/3542* (2013.01);
(Continued)

(58) Field of Classification Search
CPC ..... G02B 6/3512; G02B 6/3518; G02B 6/352
See application file for complete search history.

(56) References Cited

U.S. PATENT DOCUMENTS 5,450,512 A * 9/1995 Asakura ............. G02B 6/12007
385/48
6,253,001 B1 * 6/2001 Hoen ................... G02B 6/3518
385/16
(Continued)

FOREIGN PATENT DOCUMENTS

CN    1595221 A    3/2005
CN    1831574 A    9/2006
(Continued)

*Primary Examiner* — Daniel Petkovsek
(74) *Attorney, Agent, or Firm* — Slater Matsil, LLP

(57) ABSTRACT

An optical switch and a wavelength division multiplexing optical system are disclosed. In an embodiment an optical switch includes an input port array, an input collimator array, an input micromirror array, an output micromirror array, an output collimator array, and an output port array. All input micromirrors included in the input micromirror array can be deflected in two mutually perpendicular directions. The maximum movable ranges of reflected light that is output after all the input micromirrors reflect incident light with the same incident angle have no common intersection on a plane on which the output micromirror array is located or have a common intersection, and an area of the intersection is less than an area of a reflection region of the output micromirror array.

20 Claims, 9 Drawing Sheets

(51) Int. Cl.
*H04J 14/02* (2006.01)
*H04Q 11/00* (2006.01)

(52) U.S. Cl.
CPC ......... *G02B 26/08* (2013.01); *G02B 26/0833* (2013.01); *H04J 14/02* (2013.01); *G02B 6/3512* (2013.01); *G02B 6/3556* (2013.01); *H04Q 2011/0007* (2013.01)

(56) References Cited

U.S. PATENT DOCUMENTS

| | | | | |
|---|---|---|---|---|
| 6,330,102 B1 * | 12/2001 | Daneman | ............. | B81B 3/0021 359/290 |
| 6,437,902 B2 * | 8/2002 | Daneman | ............. | B81B 3/0021 359/290 |
| 6,470,110 B1 * | 10/2002 | Lin | ............. | G02B 6/357 385/14 |
| 6,560,384 B1 * | 5/2003 | Helkey | ............. | G02B 6/3564 385/16 |
| 6,597,825 B1 * | 7/2003 | Yuan | ............. | G02B 6/3512 385/16 |
| 6,643,425 B1 * | 11/2003 | Bowers | ............. | G02B 6/359 359/223.1 |
| 6,731,833 B2 * | 5/2004 | Sandler | ............. | G02B 6/266 385/16 |
| 6,766,085 B2 * | 7/2004 | Fouquet | ............. | G02B 6/3582 385/31 |
| 6,917,733 B1 * | 7/2005 | Campbell | ............. | G02B 6/3556 385/15 |
| 7,006,721 B2 * | 2/2006 | Kazama | ............. | G02B 6/3556 385/16 |
| 8,125,701 B2 * | 2/2012 | Yamaguchi | ........ | G02B 26/0841 359/200.6 |
| 9,213,142 B2 * | 12/2015 | Graves | ............. | G02B 6/3518 |
| 2003/0118274 A1 * | 6/2003 | Nishi | ............. | H04J 14/0291 385/17 |
| 2008/0137172 A1 | 6/2008 | Staker et al. | | |
| 2012/0236216 A1 | 9/2012 | Sharma et al. | | |

FOREIGN PATENT DOCUMENTS

| | | | |
|---|---|---|---|
| CN | 101263408 A | 9/2008 | |
| CN | 202282779 U | 6/2012 | |
| CN | 102696194 A | 9/2012 | |
| CN | 103558668 A | 2/2014 | |
| JP | 2011028235 A * | 2/2011 | ............... G02B 6/35 |

* cited by examiner

OPTICAL SWITCH AND WAVELENGTH DIVISION MULTIPLEXING OPTICAL SYSTEM

CROSS-REFERENCE TO RELATED APPLICATIONS

This application is a continuation of International Application No. PCT/CN2014/095613, filed on Dec. 30, 2014, which claims priority to Chinese Patent Application No. 201410228121.1, filed on May 27, 2014, the disclosures of the aforementioned applications are hereby incorporated by reference in their entireties.

TECHNICAL FIELD

The present invention relates to the field of optical communications, and in particular, to an optical switch and a wavelength division multiplexing optical system in the communications field.

BACKGROUND

An all-optical communications network is a high-speed broadband communications network that is based on a dense wavelength division multiplexing (DWDM) technology. The all-optical communications network uses the DWDM technology on a backbone for capacity expansion, is implemented on a switching node by using an optical add-drop multiplexer (OADM) and an optical cross-connector (OXC), and implements fiber to the home (FTTH) by using a fiber-to-the-x technology. The OXC and the OADM are core components of the all-optical communications network, and developing the optical cross-connector (OXC) and the optical add-drop multiplexer (OADM) becomes a very urgent task for constructing a large-capacity communications backbone network. Cores of the OXC and the OADM are optical switches and optical switch arrays.

However, as a switching node of a metropolitan area network and a backbone network in a wavelength division multiplexing (WDM) optical network has an increasingly high requirement for a throughput capacity, and an OXC device and an OADM device of the switching node also have increasingly large scale, technologically, an optical switch is required to have larger scale and higher integration. A current optical switch cannot meet a requirement of the switching node of the metropolitan area network and the backbone network for a throughput capacity.

SUMMARY

In view of this, embodiments of the present invention provide an optical switch and a wavelength division multiplexing optical system, which can meet a requirement of a switching node for a throughput capacity.

According to a first aspect, an optical switch is provided, where the optical switch includes: an input port array, an input collimator array connected to the input port array, an input micromirror array, an output micromirror array, an output collimator array, and an output port array connected to the output collimator array, where the input collimator array is configured to perform collimation and beam expansion on an optical signal input through the input port array, and make the optical signal, on which collimation and beam expansion have been performed, be incident on the input micromirror array; the input micromirror array is configured to reflect the optical signal, output by the input collimator array, onto the output micromirror array; the output micromirror array is configured to reflect the optical signal, reflected by the input micromirror array, onto the output collimator array; and the output collimator array is configured to couple the optical signal, reflected by the output micromirror array, to the output port array; and all input micromirrors included in the input micromirror array can be deflected in two mutually perpendicular directions, and maximum movable ranges of reflected light that is output after all the input micromirrors reflect incident light with a same incident angle have no common intersection on a plane on which the output micromirror array is located; or maximum movable ranges of reflected light that is output after all the input micromirrors reflect incident light with a same incident angle have a common intersection on a plane on which the output micromirror array is located, and an area of the common intersection is less than an area of a reflection region of the output micromirror array.

With reference to the first aspect, in a first possible implementation manner of the first aspect, the input micromirror array includes N input micromirror subarrays, the output micromirror array includes N output micromirror subarrays, and each input micromirror in the $i^{th}$ input micromirror subarray of the N input micromirror subarrays can reflect the optical signal onto each output micromirror in the $i^{th}$ output micromirror subarray of the N output micromirror subarrays, where N is a natural number, N≥2, and i=1, 2, . . . , and N.

With reference to the first possible implementation manner of the first aspect, in a second possible implementation manner of the first aspect, the $j^{th}$ input micromirror subarray of the input micromirror array includes an input adjacent region, and an input micromirror in the input adjacent region can reflect the optical signal onto an output micromirror in the $k^{th}$ output micromirror subarray, where the $k^{th}$ output micromirror subarray is adjacent to the $j^{th}$ output micromirror subarray, j and k are natural numbers, and j and k are less than or equal to N.

With reference to the first or second possible implementation manner of the first aspect, in a third possible implementation manner of the first aspect, a first input port included in the input port array is connected, by using a fiber, to a first output port included in the output port array, so that the optical signal input through a second input port included in the input port array can be output through any second output port included in the output port array.

With reference to the third possible implementation manner of the first aspect, in a fourth possible implementation manner of the first aspect, N is 6; the $i^{th}$ input micromirror subarray $I_i$ includes two input micromirror regions $I_{i,1}$ and $I_{i,2}$; the $i^{th}$ output micromirror subarray $O_i$ includes two output micromirror regions $O_{i,1}$ and $O_{i,2}$; each input micromirror in the input micromirror region $I_{1,2}$ can reflect the optical signal onto each output micromirror in the output micromirror region $O_{2,1}$; each input micromirror in $I_{2,1}$ adjacent to the input micromirror region $I_{1,2}$ can reflect the optical signal onto each output micromirror in $O_{1,2}$ adjacent to the output micromirror region $O_{2,1}$; each input micromirror in the input micromirror region $I_{3,2}$ can reflect the optical signal onto each output micromirror in the output micromirror region $O_{4,1}$; each input micromirror in $I_{4,1}$ adjacent to the input micromirror region $I_{3,2}$ can reflect the optical signal onto each output micromirror in $O_{3,2}$ adjacent to the output micromirror region $O_{4,1}$; and first input ports corresponding to the input micromirror regions $I_{1,1}$, $I_{2,2}$, $I_{3,1}$, $I_{4,2}$, $I_{5,1}$, $I_{5,2}$, $I_{6,1}$ and $I_{6,2}$ are respectively connected to first output ports corresponding to the output micromirror regions $O_{5,1}$, $O_{5,2}$, $O_{6,1}$, $O_{6,2}$, $O_{3,1}$, $O_{4,2}$, $O_{1,1}$, and $O_{2,2}$ by using fibers.

With reference to the fourth possible implementation manner of the first aspect, in a fifth possible implementation manner of the first aspect, the input micromirror regions $I_{i,1}$ and separately include L/2 input micromirrors, and the output micromirror regions $O_{i,1}$ and $O_{i,2}$ separately include L/2 output micromirrors, where L is an even number.

With reference to any possible implementation manner of the first to fourth possible implementation manners of the first aspect, in a sixth possible implementation manner of the first aspect, each input micromirror subarray includes M input micromirrors, and each output micromirror subarray includes M output micromirrors, where M is a natural number.

With reference to any possible implementation manner of the first to third possible implementation manners of the first aspect, in a seventh possible implementation manner of the first aspect, the $i^{th}$ input micromirror subarray including M input micromirrors and the $i^{th}$ output micromirror subarray including M output micromirrors form the $i^{th}$ micromirror subarray pair, and N micromirror subarray pairs include: R first micromirror subarray pairs, 2S−1 second micromirror subarray pairs, and R third micromirror subarray pairs, where R, S, and M are natural numbers, and 2R+2S−1=N;

each first micromirror subarray pair corresponds to S input ports in the input port array and 2S−1 output ports in the output port array, each second micromirror subarray pair corresponds to R input ports in the input port array and R output ports in the output port array, and each third micromirror subarray pair corresponds to 2S−1 input ports in the input port array and S output ports in the output port array; and the $y^{th}$ output port $O^1_{x,y}$ corresponding to the $x^{th}$ first micromirror subarray pair and the $x^{th}$ input port $I^2_{y,x}$ corresponding to the $y^{th}$ second micromirror subarray pair are connected by using a fiber, and the $y^{th}$ input port $I^3_{x,y}$ corresponding to the $x^{th}$ third micromirror subarray pair and the $x^{th}$ output port $O^2_{y,x}$ corresponding to the $y^{th}$ second micromirror subarray pair are connected by using a fiber, where x and y are natural numbers, x=1, 2, . . . , and R, and y=1, 2, . . . , and 2S−1.

With reference to any possible implementation manner of the first to seventh possible implementation manners of the first aspect, in an eighth possible implementation manner of the first aspect, the input micromirror included in the input micromirror array and the output micromirror included in the output micromirror array are micro-electro-mechanical system MEMS micromirrors.

According to a second aspect, a wavelength division multiplexing optical system is provided, where the wavelength division multiplexing system includes an optical switch according to an embodiment of the present invention, m1 demultiplexers DEMUXes, and m2 multiplexers MUXes, where the optical switch includes: an input port array, an input collimator array connected to the input port array, an input micromirror array, an output micromirror array, an output collimator array, and an output port array connected to the output collimator array;

the input collimator array is configured to perform collimation and beam expansion on an optical signal input through the input port array, and make the optical signal, on which collimation and beam expansion have been performed, be incident on the input micromirror array; the input micromirror array is configured to reflect the optical signal, output by the input collimator array, onto the output micromirror array; the output micromirror array is configured to reflect the optical signal, reflected by the input micromirror array, onto the output collimator array; and the output collimator array is configured to couple the optical signal, reflected by the output micromirror array, to the output port array;

all input micromirrors included in the input micromirror array can be deflected in two mutually perpendicular directions, and maximum movable ranges of reflected light that is output after all the input micromirrors reflect incident light with a same incident angle have no common intersection on a plane on which the output micromirror array is located; or maximum movable ranges of reflected light that is output after all the input micromirrors reflect incident light with a same incident angle have a common intersection on a plane on which the output micromirror array is located, and an area of the common intersection is less than an area of a reflection region of the output micromirror array;

the input micromirror array includes N input micromirror subarrays, the output micromirror array includes N output micromirror subarrays, and each input micromirror in the $i^{th}$ input micromirror subarray of the N input micromirror subarrays can reflect the optical signal onto each output micromirror in the $i^{th}$ output micromirror subarray of the N output micromirror subarrays, where N is a natural number, N≥2, and i=1, 2, . . . , and N;

the input micromirror included in the input micromirror array and the output micromirror included in the output micromirror array are micro-electro-mechanical system MEMS micromirrors;

the input port array includes N input port subarrays, the input collimator array includes N input collimator subarrays, the output port array includes N output port subarrays, and the output collimator array includes N output collimator subarrays, where each input port subarray corresponds to one input collimator subarray and one input micromirror subarray, and each output port subarray corresponds to one output collimator subarray and one output micromirror subarray; and each input port subarray includes M1 input ports, each output port subarray includes M2 output ports, the l1$^{th}$ input port in the $i^{th}$ input port subarray is connected to a port that is of the l1$^{th}$ demultiplexer DEMUX of a wavelength division multiplexing WDM system and through which the $i^{th}$ wavelength-combined optical signal is output, and the l2$^{th}$ output port in the $i^{th}$ output port subarray is connected to a port that is of the l2$^{th}$ multiplexer MUX of the WDM system and through which the $i^{th}$ wavelength-combined optical signal is input, where M1, M2, l1, and l2 are natural numbers, l1=1, 2, . . . , and m1, l2=1, 2, . . . , and m2, 2≤m1≤M1, and 2≤m2≤M2.

With reference to the second aspect, in a first possible implementation manner of the second aspect, the wavelength-combined optical signal includes at least two wavelengths.

According to a third aspect, an optical switch is provided, where the optical switch includes: an input port array, an input collimator array connected to the input port array, an input micromirror array, an output micromirror array, an output collimator array, and an output port array connected to the output collimator array, where the input collimator array is configured to perform collimation and beam expansion on an optical signal input through the input port array, and make the optical signal, on which collimation and beam expansion have been performed, be incident on the input micromirror array; the input micromirror array is configured to reflect the optical signal, output by the input collimator array, onto the output micromirror array; the output micromirror array is configured to reflect the optical signal, reflected by the input micromirror array, onto the output collimator array; and the output collimator array is configured to couple the optical signal, reflected by the output micromirror array, to the output port array; and all input micromirrors included in the input micromirror array can be deflected in two mutually perpendicular directions; the input micromirror array includes at least a first input micromirror subarray and a second input micromirror subarray, and the output micromirror array includes at least a third output micromirror subarray and a fourth output micromirror subarray; incident light can be incident within a reflection region of the third output micromirror subarray after being reflected by the first input micromirror subarray, and the incident light cannot be incident within a reflection region of the fourth output micromirror subarray after being reflected by the first input micromirror subarray; and incident light can be incident within the reflection region of the fourth output micromirror subarray after being reflected by the second input micromirror subarray.

With reference to the third aspect, in a first possible implementation manner of the third aspect, the input micromirror array includes N input micromirror subarrays, the output micromirror array includes N output micromirror subarrays, and each input micromirror in the $i^{th}$ input micromirror subarray of the N input micromirror subarrays can reflect the optical signal onto each output micromirror in the $i^{th}$ output micromirror subarray of the N output micromirror subarrays, where N is a natural number, N≥2, and i=1, 2, . . . , and N.

With reference to the first possible implementation manner of the third aspect, in a second possible implementation manner of the third aspect, the output micromirror array further includes a fifth output micromirror subarray, and the incident light can also be incident within a reflection region of the fifth output micromirror subarray after being reflected by the first input micromirror subarray, where the third output micromirror subarray and the fifth output micromirror subarray are adjacent micromirror arrays.

With reference to the first or second possible implementation manner of the third aspect, in a third possible implementation manner of the third aspect, a first input port included in the input port array is connected, by using a fiber, to a first output port included in the output port array, so that the optical signal input through a second input port included in the input port array can be output through any second output port included in the output port array.

With reference to the third possible implementation manner of the third aspect, in a fourth possible implementation manner of the third aspect, the input micromirror array includes N input micromirror subarrays, and the $i^{th}$ input micromirror subarray of the N input micromirror subarrays includes two input micromirror subregions $I_{i,1}$ and $I_{i,2}$; the output micromirror array includes N output micromirror subarrays, and the $i^{th}$ output micromirror subarray of the N output micromirror subarrays includes two output micromirror subregions $O_{i,1}$ and $O_{i,2}$; each input micromirror in the input micromirror subregion $I_{1,2}$ can reflect the optical signal onto each output micromirror in the output micromirror subregion $O_{2,2}$; each input micromirror in $I_{2,1}$ adjacent to the input micromirror subregion $I_{1,2}$ can reflect the optical signal onto each output micromirror in $O_{1,2}$ adjacent to the output micromirror subregion $O_{2,1}$; each input micromirror in the input micromirror subregion $I_{3,2}$ can reflect the optical signal onto each output micromirror in the output micromirror subregion $O_{4,1}$; and each input micromirror in $I_{4,1}$ adjacent to the input micromirror subregion $I_{3,2}$ can reflect the optical signal onto each output micromirror in $O_{3,2}$ adjacent to the output micromirror subregion $O_{4,1}$, where first input ports corresponding to the input micromirror subregions $I_{1,1}$, $I_{2,2}$, $I_{3,1}$, $I_{4,2}$, $I_{5,1}$, $I_{5,2}$, $I_{6,1}$, and $I_{6,2}$ are respectively connected to first output ports corresponding to the output micromirror subregions $O_{5,1}$, $O_{5,2}$, $O_{6,1}$, $O_{6,2}$, $O_{3,1}$, $O_{4,2}$, $O_{1,1}$, and $O_{2,2}$ by using fibers, and N=6.

With reference to the fourth possible implementation manner of the third aspect, in a fifth possible implementation manner of the third aspect, the input micromirror subregions $I_{i,1}$ and $I_{i,2}$ separately include L/2 input micromirrors, and the output micromirror subregions $O_{i,1}$ and $O_{i,2}$ separately include L/2 output micromirrors, where L is an even number.

With reference to any possible implementation manner of the first to fourth possible implementation manners of the third aspect, in a sixth possible implementation manner of the third aspect, each input micromirror subarray includes M input micromirrors, and each output micromirror subarray includes M output micromirrors, where M is a natural number.

With reference to any possible implementation manner of the first to third possible implementation manners of the third aspect, in a seventh possible implementation manner of the third aspect, the $i^{th}$ input micromirror subarray including M input micromirrors and the $i^{th}$ output micromirror subarray including M output micromirrors form the $i^{th}$ micromirror subarray pair, and N micromirror subarray pairs include: R first micromirror subarray pairs, 2S−1 second micromirror subarray pairs, and R third micromirror subarray pairs, where R, S, and M are natural numbers, and 2R+2S−1=N;

each first micromirror subarray pair corresponds to S input ports in the input port array and 2S−1 output ports in the output port array, each second micromirror subarray pair corresponds to R input ports in the input port array and R output ports in the output port array, and each third micromirror subarray pair corresponds to 2S−1 input ports in the input port array and S output ports in the output port array; and the $y^{th}$ output port $O^1_{x,y}$ corresponding to the $x^{th}$ first micromirror subarray pair and the $x^{th}$ input port $I^2_{y,x}$ corresponding to the $y^{th}$ second micromirror subarray pair are connected by using a fiber, and the $y^{th}$ input port $I^3_{x,y}$ corresponding to the $x^{th}$ third micromirror subarray pair and the $x^{th}$ output port $O^2_{y,x}$ corresponding to the $y^{th}$ second micromirror subarray pair are connected by using a fiber, where x and y are natural numbers, x=1, 2, . . . , and R, and y=1, 2, . . . , and 2S−1.

With reference to any possible implementation manner of the first to seventh possible implementation manners of the third aspect, in an eighth possible implementation manner of the third aspect, the input micromirror included in the input micromirror array and the output micromirror included in the output micromirror array are micro-electro-mechanical system MEMS micromirrors.

According to a fourth aspect, a wavelength division multiplexing optical system is provided, where the wavelength division multiplexing optical system includes an optical switch according to an embodiment of the present invention, m1 demultiplexers DEMUXes, and m2 multiplexers MUXes, where the input port array includes N input port subarrays, the input collimator array includes N input collimator subarrays, the output port array includes N output port subarrays, and the output collimator array includes N output collimator subarrays, where each input port subarray corresponds to one input collimator subarray and one input micromirror subarray, and each output port subarray corresponds to one output collimator subarray and one output micromirror subarray;

each input port subarray includes M1 input ports, each output port subarray includes M2 output ports, the $l1^{th}$ input port in the $i^{th}$ input port subarray is connected to a port that is of the $l2^{th}$ demultiplexer DEMUX of a wavelength division multiplexing WDM system and through which the $i^{th}$ wavelength-combined optical signal is output, and the $l2^{th}$ output port in the $i^{th}$ output port subarray is connected to a port that is of the $l2^{th}$ multiplexer MUX of the WDM system and through which the $i^{th}$ wavelength-combined optical signal is input, where M1, M2, l1, and l2 are natural numbers, l1=1, 2, . . . , and m1, l2=1, 2, . . . , and m2, 2≤m1≤M1, and 2≤m2≤M2;

the optical switch includes: an input port array, an input collimator array connected to the input port array, an input micromirror array, an output micromirror array, an output collimator array, and an output port array connected to the output collimator array;

the input collimator array is configured to perform collimation and beam expansion on an optical signal input through the input port array, and make the optical signal, on which collimation and beam expansion have been performed, be incident on the input micromirror array; the input micromirror array is configured to reflect the optical signal, output by the input collimator array, onto the output micromirror array; the output micromirror array is configured to reflect the optical signal, reflected by the input micromirror array, onto the output collimator array; and the output collimator array is configured to couple the optical signal, reflected by the output micromirror array, to the output port array;

all input micromirrors included in the input micromirror array can be deflected in two mutually perpendicular directions; the input micromirror array includes at least a first input micromirror subarray and a second input micromirror subarray, and the output micromirror array includes at least a third output micromirror subarray and a fourth output micromirror subarray; incident light can be incident within a reflection region of the third output micromirror subarray after being reflected by the first input micromirror subarray, and the incident light cannot be incident within a reflection region of the fourth output micromirror subarray after being reflected by the first input micromirror subarray; and incident light can be incident within the reflection region of the fourth output micromirror subarray after being reflected by the second input micromirror subarray;

the input micromirror array includes N input micromirror subarrays, the output micromirror array includes N output micromirror subarrays, and each input micromirror in the $i^{th}$ input micromirror subarray of the N input micromirror subarrays can reflect the optical signal onto each output micromirror in the $i^{th}$ output micromirror subarray of the N output micromirror subarrays, where N is a natural number, N≥2, and i=1, 2, . . . , and N; and the input micromirror included in the input micromirror array and the output micromirror included in the output micromirror array are micro-electro-mechanical system MEMS micromirrors.

With reference to the fourth aspect, in a first possible implementation manner of the fourth aspect, the wavelength-combined optical signal includes at least two wavelengths.

Based on the foregoing technical solutions, according to the optical switch and the wavelength division multiplexing optical system in the embodiments of the present invention, the optical switch and the wavelength division multiplexing optical system are designed as that maximum movable ranges of reflected light that is output after all input micromirrors reflect incident light with a same incident angle have no common intersection on a plane on which an output micromirror array is located; or maximum movable ranges of reflected light that is output after all input micromirrors reflect incident light with a same incident angle have a common intersection on a plane on which an output micromirror array is located, and an area of the common intersection is less than an area of a reflection region of the output micromirror array, which can implement a large-scale array, and therefore can meet a requirement of a switching node for a throughput capacity.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that the technical solutions in the embodiments of the present invention may be applied to various optical networks, including a passive optical network (PON) such as a gigabit-capable passive optical network (GPON) system, a 10G Ethernet passive optical network (10G EPON), and a 10-gigabit-capable passive optical network (XG PON). In addition, for ease of description, the following uses a WDM system as an example for description, but the present invention is not limited thereto.

Figure 1:
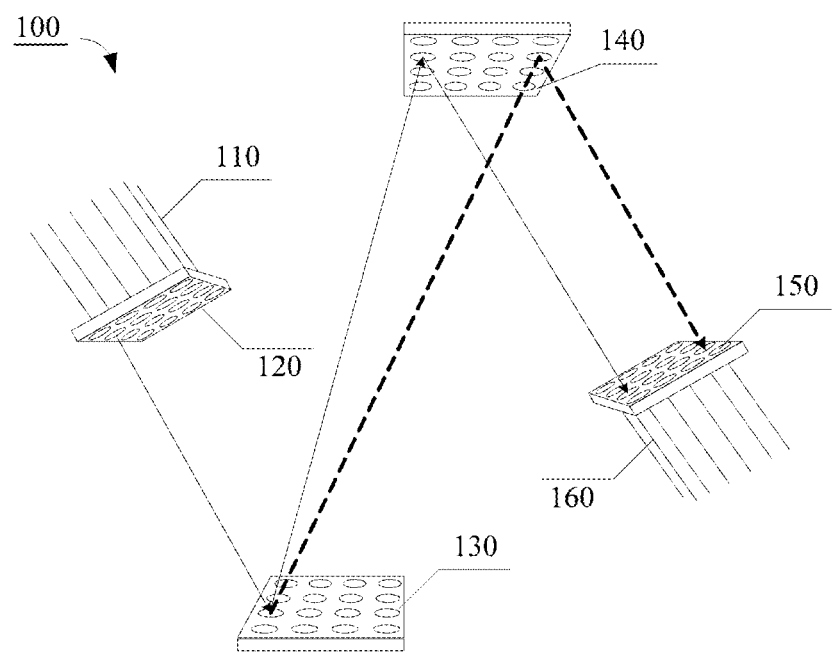
FIG. 1 is a schematic block diagram of an optical switch according to an embodiment of the present invention.

FIG. 1 shows a schematic block diagram of an optical switch 100 according to an embodiment of the present invention. As shown in FIG. 1, the optical switch 100 includes: an input port array 110, an input collimator array 120 connected to the input port array 110, an input micromirror array 130, an output micromirror array 140, an output collimator array 150, and an output port array 160 connected to the output collimator array 150.

The input collimator array 120 is configured to perform collimation and beam expansion on an optical signal input through the input port array 110, and make the optical signal, on which collimation and beam expansion have been performed, be incident on the input micromirror array 130.

The input micromirror array 130 is configured to reflect the optical signal, output by the input collimator array 120, onto the output micromirror array 140.

The output micromirror array 140 is configured to reflect the optical signal, reflected by the input micromirror array 130, onto the output collimator array 150.

The output collimator array 150 is configured to couple the optical signal, reflected by the output micromirror array 140, to the output port array 160.

All input micromirrors included in the input micromirror array 130 can be deflected in two mutually perpendicular directions, and maximum movable ranges of reflected light that is output after all the input micromirrors reflect incident light with a same incident angle have no common intersection on a plane on which the output micromirror array 140 is located; or maximum movable ranges of reflected light that is output after all the input micromirrors reflect incident light with a same incident angle have a common intersection on a plane on which the output micromirror array 140 is located, and an area of the common intersection is less than an area of a reflection region of the output micromirror array 140.

Specifically, the input port array 110 may include one or more input ports, where each input port may be an input fiber that couples the optical signal to the input collimator array 120, and each input fiber may couple the optical signal to one or more input collimators in the input collimator array 120. Similarly, the output port array 160 may include one or more output ports, where each output port may be an output fiber that couples, to another device, the optical signal from the output collimator array 150, and each output fiber may couple, to another device, the optical signal from one or more output collimators in the output collimator array 150.

It should be understood that in this embodiment of the present invention, a quantity of input ports included in the input port array 110 may be equal or may be not equal to a quantity of output ports included in the output port array 160, but the present invention is not limited thereto.

It should be understood that in this embodiment of the present invention, for light output through a fiber and a collimator, approximate analysis is generally performed according to a Gaussian beam. A larger waist radius of the Gaussian beam leads to a smaller divergence angle and a longer propagation distance. Because a beam waist of a beam output by a fiber, especially a single-mode fiber, is very small, in order to enable the beam to have a longer propagation distance, a collimator may be used to convert the beam output by the fiber into a beam with a larger beam waist, so that the beam can be propagated for a longer distance in free space.

Therefore, in this embodiment of the present invention, the input optical signal enters the optical switch 100 through the input port array 110. The input collimator array 120 is configured to perform collimation and beam expansion on the optical signal input through the input port array 110, to convert the optical signal with a small beam waist into an optical signal with a large beam waist, so that the optical signal is transmitted for a longer distance in the free space. The optical signal on which collimation and beam expansion have been performed is incident on the input micromirror array 130 of the optical switch 100 by means of the input collimator array 120.

It should be understood that in this embodiment of the present invention, the input collimator array 120 includes one or more input collimators, and a quantity of input collimators included in the input collimator array 120 may be equal or may be not equal to the quantity of input ports included in the input port array 110. Preferably, in this embodiment of the present invention, there is a one-to-one correspondence between the input collimators included in the input collimator array 120 and the input ports included in the input port array 110, that is, each input collimator corresponds to one input port.

Similarly, in this embodiment of the present invention, the output collimator array 150 is configured to couple the optical signal, reflected by the output micromirror array 140, to the output port array 160. For example, the output collimator array 150 converts the optical signal reflected by the output micromirror array 140 into an optical signal with a small beam waist to reduce a divergence angle, facilitating coupling of the optical signal to the output port array 160.

It should be understood that in this embodiment of the present invention, the output collimator array 150 includes one or more output collimators, and a quantity of output collimators included in the output collimator array 150 may be equal or may be not equal to the quantity of output ports included in the output port array 160. Preferably, in this embodiment of the present invention, there is a one-to-one correspondence between the output collimators included in the output collimator array 150 and the output ports included in the output port array 160, that is, each output collimator corresponds to one output port.

Figure 2:
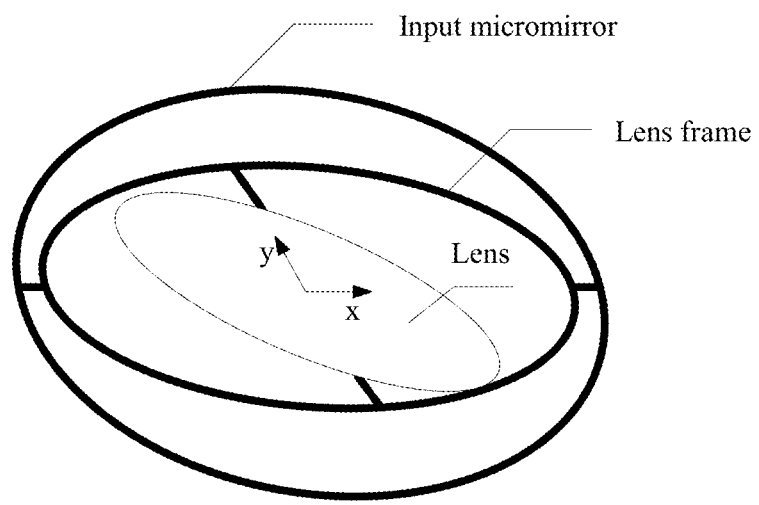
FIG. 2 is a schematic block diagram of an input micromirror according to an embodiment of the present invention.

In this embodiment of the present invention, each input micromirror included in the input micromirror array 130 can be deflected in two mutually perpendicular directions, so that a reflection direction of reflected light output after incident light is reflected can be changed within a particular range, and the input optical signal can be reflected onto the output micromirror array 140. For example, as shown in FIG. 2, an input micromirror may include a lens and a lens frame that is configured to fasten the lens. The lens may be deflected around an axis y, the lens frame may be deflected around an axis x, and the axis x and the axis y are mutually perpendicular, so that the input micromirror may be deflected in two mutually perpendicular directions, and therefore, a reflection direction of reflected light output after incident light is reflected can be changed within a particular range. It should be understood that in this embodiment of the present invention, description is provided only by using the input micromirror shown in FIG. 2 as an example, but the present invention is not limited thereto.

Similarly, each output micromirror included in the output micromirror array 140 can also be deflected in two mutually perpendicular directions, so that a reflection direction of reflected light output after incident light is reflected can be changed within a particular range, and the input optical signal can be reflected onto the output collimator array 150. However, this embodiment of the present invention is not limited thereto.

In this embodiment of the present invention, there is a correspondence between each input micromirror included in the input micromirror array 130 and each input collimator included in the input collimator array 120. For example, optionally, there is a one-to-one correspondence between the input micromirror and the input collimator, that is, there is a one-to-one correspondence between each input micromirror included in the input micromirror array 130 and each input port included in the input port array 110. Similarly, there is a correspondence between each output micromirror included in the output micromirror array 140 and each output collimator included in the output collimator array 150. For example, optionally, there is a one-to-one correspondence between the output micromirror and the output collimator, that is, there is a one-to-one correspondence between each output micromirror included in the output micromirror array 140 and each output port included in the output port array 160. However, the present invention is not limited thereto.

In this embodiment of the present invention, because an input micromirror can be deflected in two mutually perpendicular directions, reflected light output after the input micromirror reflects incident light has a particular movable range on the plane on which the output micromirror array 140 is located. The maximum movable ranges of the reflected light that is output after all the input micromirrors reflect the incident light with the same incident angle have no common intersection on the plane on which the output micromirror array 140 is located, that is, on the plane on which the output micromirror array 140 is located, there is no region that can be located simultaneously within the maximum movable ranges of the reflected light output by all the input micromirrors. This also means that not all the input micromirrors can reflect the incident light with the same incident angle onto any output micromirror in the output micromirror array 140, which can implement a large-scale array, and therefore can meet a requirement of a switching node for a throughput capacity.

It should be understood that in this embodiment of the present invention, "full cross-connect" refers to that an optical signal input through any input port can be output through any output port of the optical switch, that is, each input micromirror in the input micromirror array can reflect the incident light with the same incident angle onto any output micromirror in the output micromirror array.

In this embodiment of the present invention, optionally, the maximum movable ranges of the reflected light that is output after all the input micromirrors reflect the incident light with the same incident angle may have a common intersection on the plane on which the output micromirror array 140 is located, but an area of the common intersection is less than the area of the reflection region of the output micromirror array 140.

This also means that even though all the input micromirrors can reflect the incident light with the same incident angle onto some particular output micromirrors in the output micromirror array 140, not all the input micromirrors can reflect the incident light with the same incident angle onto any output micromirror in the output micromirror array 140, which can implement a large-scale array, and therefore can meet a requirement of a switching node for a throughput capacity.

Figure 3:
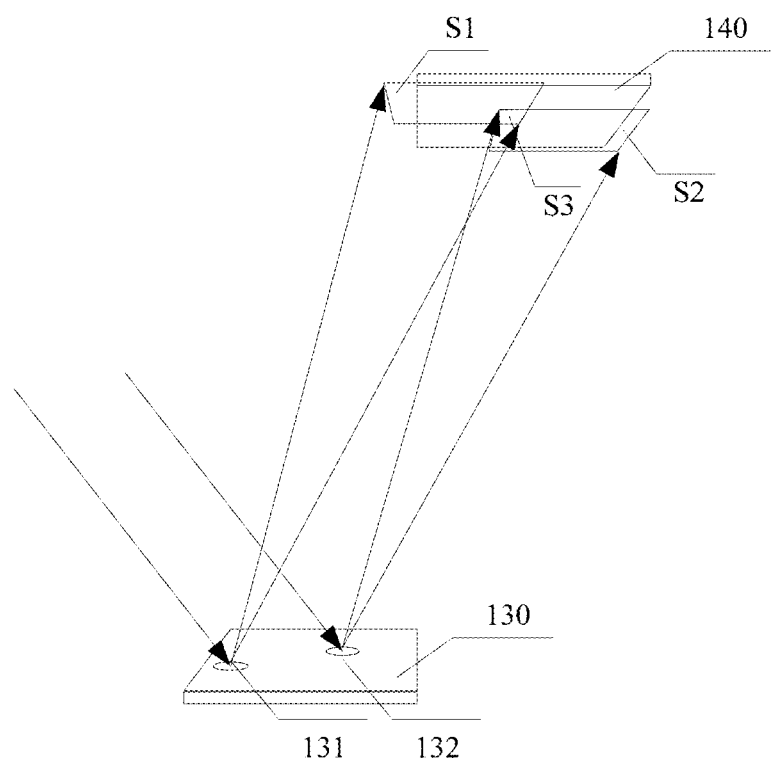
FIG. 3 is a schematic block diagram of an input micromirror array and an output micromirror array according to an embodiment of the present invention.

For example, as shown in FIG. 3, the input micromirror array 130 includes input micromirrors 131 and 132. Because the input micromirrors 131 and 132 can be deflected in two mutually perpendicular directions, reflected light output after the input micromirrors 131 and 132 reflect incident light has particular movable ranges on the plane on which the output micromirror array 140 is located, as shown by S1 and S2 in FIG. 3 respectively, where S3 is an intersection of S1 and S2.

However, it should be understood that for the optical switch in this embodiment of the present invention, maximum movable ranges of reflected light that is output by all input micromirrors have no common intersection or same intersection on a plane on which an output micromirror array is located; or even though there is a common intersection, an area of the common intersection is less than an area of a reflection region of the output micromirror array.

Therefore, according to the optical switch in this embodiment of the present invention, the optical switch is designed as that maximum movable ranges of reflected light that is output after all input micromirrors reflect incident light with a same incident angle have no common intersection on a plane on which an output micromirror array is located; or maximum movable ranges of reflected light that is output after all input micromirrors reflect incident light with a same incident angle have a common intersection on a plane on which an output micromirror array is located, and an area of the common intersection is less than an area of a reflection region of the output micromirror array, which can implement a large-scale array, and therefore can meet a requirement of a switching node for a throughput capacity.

Figure 4:
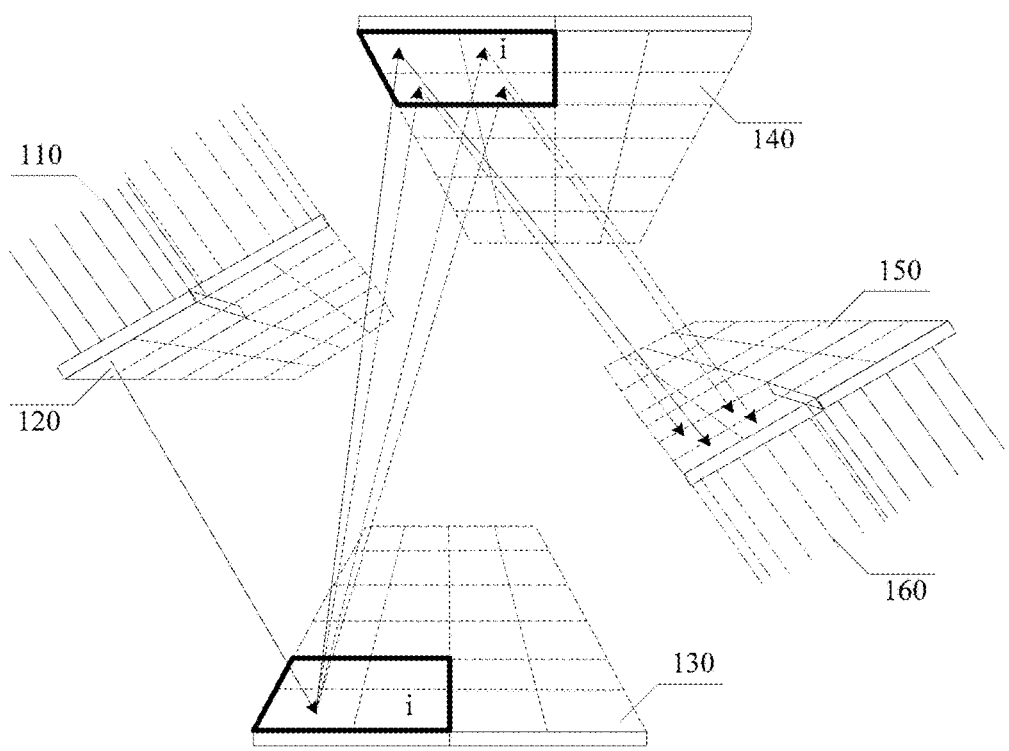
FIG. 4 is another schematic block diagram of an optical switch according to an embodiment of the present invention.

In this embodiment of the present invention, optionally, as shown in FIG. 4, the input micromirror array 130 includes N input micromirror subarrays, the output micromirror array 140 includes N output micromirror subarrays, and each input micromirror in the $i^{th}$ input micromirror subarray of the N input micromirror subarrays can reflect the optical signal onto each output micromirror in the $i^{th}$ output micromirror subarray of the N output micromirror subarrays, where N is a natural number, N≥2, and i=1, 2, . . . , and N.

Specifically, for example, as shown in FIG. 4, the input micromirror array 130 includes 6 input micromirror subarrays, and each input micromirror subarray may include, for example, 4 input micromirrors; the output micromirror array 140 includes 6 output micromirror subarrays, and each output micromirror subarray may also include, for example, 4 output micromirrors. Each input micromirror in the $i^{th}$ input micromirror subarray can reflect the optical signal onto any output micromirror of 4 output micromirrors included in the $i^{th}$ output micromirror subarray, as shown by solid lines and dashed lines in FIG. 4.

That is, in this embodiment of the present invention, for a micromirror subarray pair including any input micromirror subarray and a corresponding output micromirror subarray, the micromirror subarray pair internally has a full cross-connect feature. That is, each input micromirror in the micromirror subarray pair can reflect the optical signal onto any output micromirror in the micromirror subarray pair. That is, maximum movable ranges of reflected light that is output after all input micromirrors in the micromirror subarray pair reflect incident light with a same incident angle have a common intersection on a plane on which output micromirrors in the micromirror subarray pair are located, and an area of the common intersection is greater than or equal to areas of reflection regions of all the output micromirrors.

Further, the input port array 110 may include N input port subarrays, the input collimator array 120 may include N input collimator subarrays, the output collimator array 150 may include N output collimator subarrays, and the output port array 160 may also include N output port subarrays, where there is a one-to-one correspondence between the N input micromirror subarrays and the N input collimator subarrays, and between the N input micromirror subarrays and the N input port subarrays, and there is also a one-to-one correspondence between the N output micromirror subarrays and the N output collimator subarrays, and between the N output micromirror subarrays and the N output port subarrays. However, this embodiment of the present invention is not limited thereto.

Figure 5:
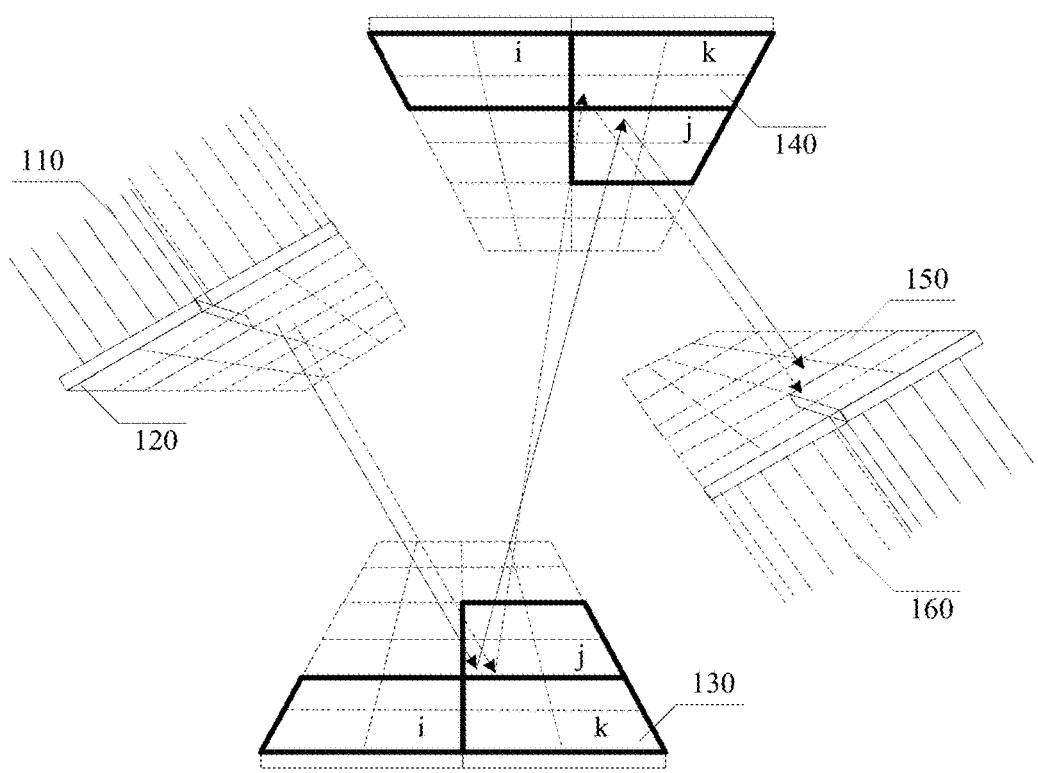
FIG. 5 is still another schematic block diagram of an optical switch according to an embodiment of the present invention.

In this embodiment of the present invention, optionally, as shown in FIG. 5, the $j^{th}$ input micromirror subarray of the input micromirror array 130 includes an input adjacent region, and an input micromirror in the input adjacent region can reflect the optical signal onto an output micromirror in the $k^{th}$ output micromirror subarray, where the $k^{th}$ output micromirror subarray is adjacent to the $j^{th}$ output micromirror subarray, j and k are natural numbers, and j and k are less than or equal to N.

That is, in this embodiment of the present invention, one or more input micromirror subarrays of the input micromirror array 130 have an input adjacent region. An input micromirror in the input adjacent region not only can reflect the optical signal onto any output micromirror in a corresponding output micromirror subarray, but also can reflect the optical signal onto an output micromirror in an output micromirror subarray adjacent to the corresponding output micromirror subarray.

It should be understood that in this embodiment of the present invention, the $j^{th}$ input micromirror subarray may be one or more particular input micromirror subarrays of the input micromirror array 130, or may be any input micromirror subarray of the input micromirror array 130. This embodiment of the present invention is not limited thereto.

It should be also understood that the input adjacent region included in the $j^{th}$ input micromirror subarray is close to the $k^{th}$ input micromirror subarray, and the input adjacent region may be a part or all of reflection regions of one or more input micromirrors included in the $j^{th}$ input micromirror subarray. This embodiment of the present invention is not limited thereto.

Specifically, in this embodiment of the present invention, an optical signal is first input to an input collimator array via an input port array, and the optical signal passing through the input collimator array arrives at an input micromirror array, where an input micromirror, corresponding to each input beam, in the input micromirror array can reflect the beam onto different micromirrors in an output micromirror array by means of deflection by a different angle; a corresponding micromirror in the output micromirror array can further reflect, by means of deflection, the beam onto an output collimator array corresponding to the output micromirror array; and after performing beam conversion, the output collimator array couples the beam to a corresponding output port array, thereby completing a scheduling function of an optical switch.

It should be understood that in the optical switch according to this embodiment of the present invention, an optical signal that enters the optical switch through each input port and input collimator can be incident only on an input micromirror corresponding to the input port and the input collimator; similarly, each optical signal reflected by an output micromirror can enter only an output collimator corresponding to the output micromirror and be output through a corresponding output port.

For example, the optical switch according to this embodiment of the present invention may include: N input port subarrays, N output port subarrays, N input collimator subarrays, N input micromirror subarrays, N output micromirror subarrays, and N output collimator subarrays, where there is a one-to-one correspondence between the N input micromirror subarrays and the N input collimator subarrays, and between the N input micromirror subarrays and the N input port subarrays, and there is also a one-to-one correspondence between the N output micromirror subarrays and the N output collimator subarrays, and between the N output micromirror subarrays and the N output port subarrays.

In the foregoing optical switch, each input micromirror in the $i^{th}$ input micromirror subarray can reflect an optical signal incident via an input collimator subarray onto any output micromirror in the corresponding $i^{th}$ output micromirror subarray; similarly, any output micromirror in the $i^{th}$ output micromirror subarray can reflect a beam, reflected by the output micromirror, onto the corresponding $i^{th}$ output collimator subarray by means of deflection by a different angle, so that the beam is output through a corresponding output port in the corresponding $i^{th}$ output port subarray. Therefore, an optical signal entered through any input port in the $i^{th}$ input port subarray can be output through any output port in the $i^{th}$ output port subarray, as shown by solid lines and dashed lines in FIG. 4, or as shown by solid lines in FIG. 5.

Further, in the foregoing optical switch, if the $k^{th}$ input micromirror subarray is adjacent to the $j^{th}$ input micromirror subarray, or the $k^{th}$ output micromirror subarray is adjacent to the $j^{th}$ output micromirror subarray, for an input adjacent region that is close to an edge of the $k^{th}$ input micromirror subarray and that is in the $j^{th}$ input micromirror subarray, an input micromirror in the input adjacent region can reflect an optical signal onto an output micromirror in the $k^{th}$ output micromirror subarray, and after passing through the $k^{th}$ output collimator subarray, the optical signal is output through an output port in the $k^{th}$ output port subarray. Therefore, optical signals entered through some input ports in the $j^{th}$ input port subarray can be output through some output ports in the $k^{th}$ output port subarray, as shown by dashed lines in FIG. 5.

It should be understood that in this embodiment of the present invention, description is provided only by using an example in which quantities of subarrays included in all arrays are equal, but the present invention is not limited thereto. The quantities of subarrays included in all the arrays may also be not equal, for example, a quantity of input micromirror subarrays may be not equal to a quantity of output micromirror subarrays. It should be also understood that in this embodiment of the present invention, description is provided only by using an example in which quantities of devices included in all subarrays are equal, but the present invention is not limited thereto. The quantities of devices included in all the subarrays may also be not equal, for example, a quantity of input micromirrors included in an input micromirror subarray may be not equal to a quantity of output micromirrors included in an output micromirror subarray.

Therefore, according to the optical switch in this embodiment of the present invention, the optical switch is designed as that maximum movable ranges of reflected light that is output after all input micromirrors reflect incident light with a same incident angle have no common intersection on a plane on which an output micromirror array is located; or maximum movable ranges of reflected light that is output after all input micromirrors reflect incident light with a same incident angle have a common intersection on a plane on which an output micromirror array is located, and an area of the common intersection is less than an area of a reflection region of the output micromirror array, which can implement a large-scale array, and therefore can meet a requirement of a switching node for a throughput capacity.

Figure 6:
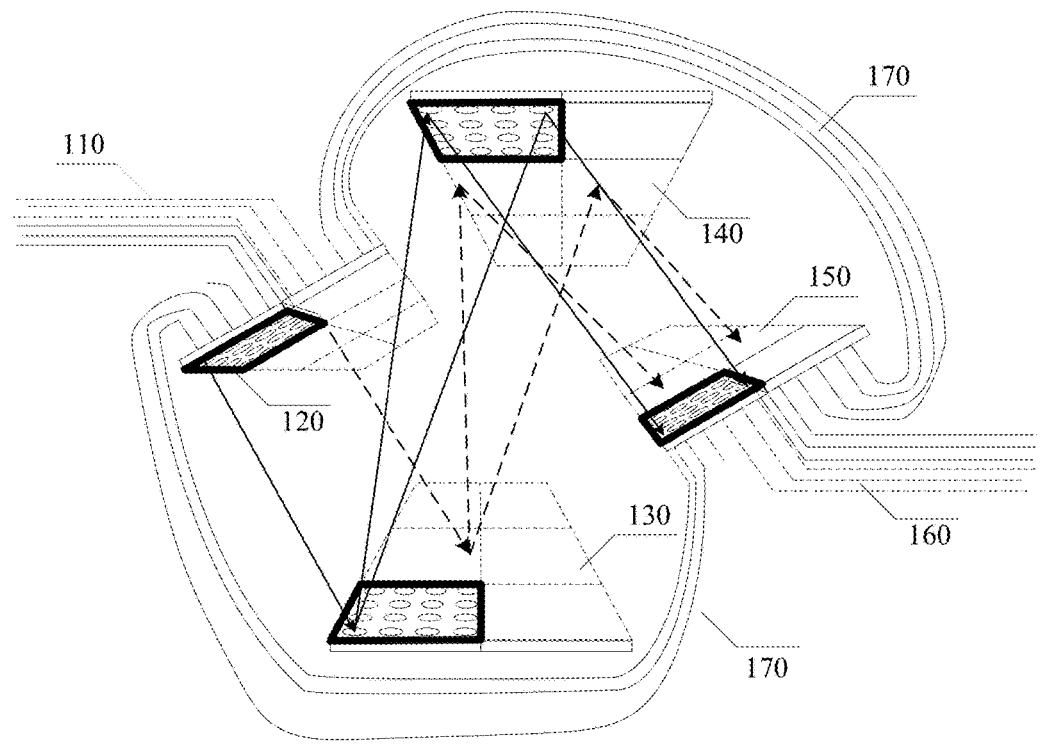
FIG. 6 is a schematic block diagram of an optical switch according to another embodiment of the present invention.

In this embodiment of the present invention, optionally, as shown in FIG. 6, a first input port included in the input port array 110 is connected to a first output port included in the output port array 160 by using a fiber 170, so that the optical signal input through a second input port included in the input port array 110 can be output through any second output port included in the output port array 160.

Specifically, for the optical switch in this embodiment of the present invention, within corresponding subarray ranges, full cross-connect can be implemented for an optical signal, that is, an optical signal entered through each input port in an input port subarray can be output through any output port in a corresponding output port subarray. However, between input ports and output ports of the entire optical switch, full cross-connect cannot be implemented for an optical signal. Therefore, some input ports and some output ports may be connected by using fibers, and then a feature that optical signals entered through some input ports in an input port subarray can be output through some output ports in an output port subarray adjacent to a corresponding output port subarray is used, so that full cross-connect can be implemented for an optical signal between the input ports and the output ports of the entire optical switch, that is, an optical signal input through any second input port of the optical switch can be output through any second output port of the optical switch.

It should be understood that in this embodiment of the present invention, the first input port indicates an input port that is in the input port array and connected to an output port by using a fiber, and correspondingly, the first output port indicates an output port that is in the output port array and connected to an input port by using a fiber; the second input port indicates an input port that is in the input port array and not connected to an output port by using a fiber, that is, an input port in the input port array except the first input port, and correspondingly, the second output port indicates an output port that is in the output port array and not connected to an input port by using a fiber, that is, an output port in the output port array except the first output port.

Figures 7, 8:
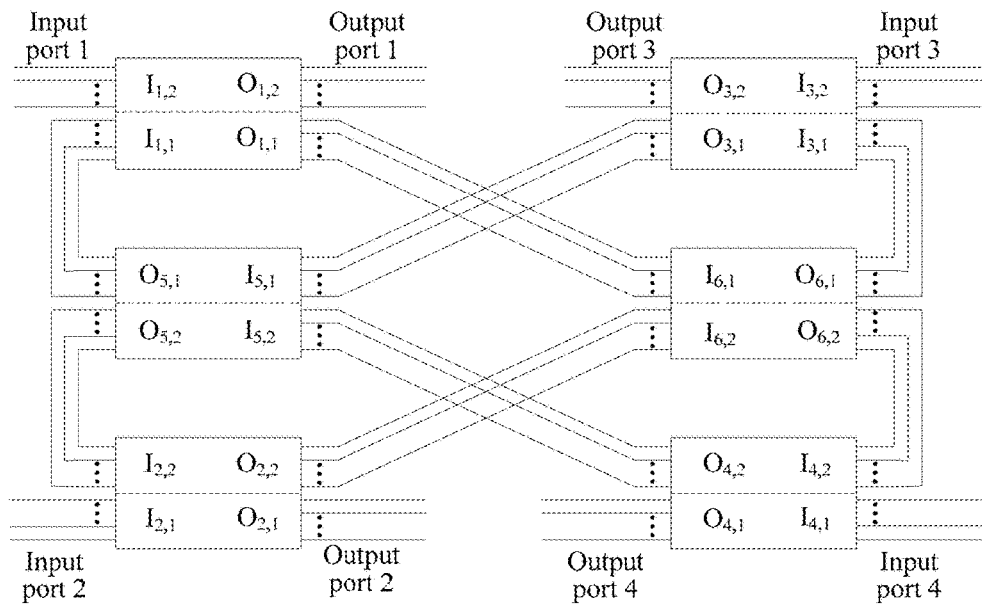
FIG. 7 is a schematic block diagram of an input micromirror array and an output micromirror array according to another embodiment of the present invention.
FIG. 8 is a schematic block diagram of a connection relationship between a first input port and a first output port according to another embodiment of the present invention.

Optionally, in this embodiment of the present invention, as shown in FIG. 7, N is 6; the $i^{th}$ input micromirror subarray $I_i$ includes two input micromirror regions $I_{i,1}$ and $I_{i,2}$; the $i^{th}$ output micromirror subarray $O_i$ includes two output micromirror regions $O_{i,1}$ and $O_{i,2}$; each input micromirror in the input micromirror region $I_{1,2}$ can reflect the optical signal onto each output micromirror in the output micromirror region $O_{2,1}$; each input micromirror in $I_{2,1}$ adjacent to the input micromirror region $I_{1,2}$ can reflect the optical signal onto each output micromirror in $O_{1,2}$ adjacent to the output micromirror region $O_{2,1}$; each input micromirror in the input micromirror region $I_{3,2}$ can reflect the optical signal onto each output micromirror in the output micromirror region $O_{4,1}$; each input micromirror in $I_{4,1}$ adjacent to the input micromirror region $I_{3,2}$ can reflect the optical signal onto each output micromirror in $O_{3,2}$ adjacent to the output micromirror region $O_{4,1}$; and first input ports corresponding to the input micromirror regions $I_{1,1}$, $I_{2,2}$, $I_{3,1}$, $I_{4,2}$, $I_{5,1}$, $I_{5,2}$, $I_{6,1}$ and $I_{6,2}$ are respectively connected to first output ports corresponding to the output micromirror regions $O_{5,1}$, $O_{5,2}$, $O_{6,1}$, $O_{6,2}$, $O_{3,1}$, $O_{4,2}$, $O_{1,1}$, and $O_{2,2}$ by using fibers.

Specifically, in this embodiment of the present invention, an optical signal entered through any input port in the $i^{th}$ input port subarray can be output through any output port in the $i^{th}$ output port subarray, where i is a natural number, and i=1, 2, . . . , and 6. In addition, each input micromirror in the input micromirror region $I_{1,2}$ can reflect the optical signal onto each output micromirror in the output micromirror region $O_{2,1}$; each input micromirror in the input micromirror regions $I_{2,1}$, $I_{3,2}$, and $I_{4,1}$ can reflect the optical signal onto each output micromirror in the output micromirror regions $O_{1,2}$, $O_{4,1}$, and $O_{3,2}$; and a connection relationship between each first input port and each first output port is shown in FIG. 8.

It should be understood that as shown in FIG. 8, input ports corresponding to the input micromirror regions $I_{1,2}$, $I_{2,1}$, $I_{3,2}$, and $I_{4,1}$ are second input ports that are reserved for receiving an externally input optical signal; output ports corresponding to the output micromirror regions $O_{2,1}$, $O_{1,2}$, $O_{4,1}$, and $O_{3,2}$ are second output ports that are reserved for outputting an optical signal to the outside.

It should be also understood that as shown in FIG. 8, the first input ports corresponding to the input micromirror regions $I_{1,1}$, $I_{2,2}$, $I_{3,1}$, $I_{4,2}$, $I_{5,1}$, $I_{5,2}$, $I_{6,1}$, and $I_{6,2}$, and the first output ports corresponding to the output micromirror regions $O_{5,1}$, $O_{5,2}$, $O_{6,1}$, $O_{6,2}$, $O_{3,1}$, $O_{4,2}$, $O_{1,1}$, and $O_{2,2}$ correspond in a one-to-one manner, and are connected by using fibers. For example, input ports corresponding to the input micromirror region $I_{1,1}$ and output ports corresponding to the output micromirror region $O_{5,1}$ correspond in a one-to-one manner, and are connected by using fibers. For another example, input ports corresponding to the input micromirror region $I_{3,1}$ and output ports corresponding to the output micromirror region $O_{6,1}$ correspond in a one-to-one manner, and are connected by using fibers. It should be also understood that the first input ports include input ports corresponding to the input micromirror regions $I_{1,1}$, $I_{2,2}$, $I_{3,1}$, $I_{4,2}$, $I_{5,1}$, $I_{5,2}$, $I_{6,1}$, and $I_{6,2}$; similarly, the first output ports include output ports corresponding to the output micromirror regions $O_{5,1}$, $O_{5,2}$, $O_{6,1}$, $O_{6,2}$, $O_{3,1}$, $O_{4,2}$, $O_{1,1}$, and $O_{2,2}$.

Therefore, for the optical switch according to this embodiment of the present invention, an optical signal input through any input port of the second input ports can be output through any second output port of the optical switch. Specifically, a path for transmitting an optical signal between input ports and output ports may be shown in the following Table 1.

TABLE 1

| | Output port 1 | Output port 2 | Output port 3 | Output port 4 |
|---|---|---|---|---|
| Input port 1 | → | → | →$O_{1,1}$-$I_{6,1}$→$O_{6,1}$-$I_{3,1}$→ | →$O_{1,1}$-$I_{6,1}$→$O_{6,2}$-$I_{4,2}$→ |

TABLE 1-continued

|  | Output port 1 | Output port 2 | Output port 3 | Output port 4 |
|---|---|---|---|---|
| Input port 2 | → | → | →$O_{2,2}$-$I_{6,2}$→$O_{6,1}$-$I_{3,1}$→ | →$O_{2,2}$-$I_{6,2}$→$O_{6,2}$-$I_{4,2}$→ |
| Input port 3 | →$O_{3,1}$-$I_{5,1}$→$O_{5,1}$-$I_{1,1}$→ | →$O_{3,1}$-$I_{5,1}$→$O_{5,2}$-$I_{2,2}$→ | → | → |
| Input port 4 | →$O_{4,2}$-$I_{5,2}$→$O_{5,1}$-$I_{1,1}$→ | →$O_{4,2}$-$I_{5,2}$→$O_{5,2}$-$I_{2,2}$→ | → | → |

As shown in Table 1, the symbol "→" indicates a path of transmitting, in space, an optical signal from an input micromirror to an output micromirror, and the symbol "-" indicates a path of transmitting the optical signal in a fiber.

By means of deflection of the input micromirror, full cross-connect can be implemented for an optical signal inside a subarray; therefore, optical signals may be input through the input port 1, the input port 2, the input port 3, and the input port 4, and be output through the output port 1, the output port 2, the output port 3, and the output port 4 respectively. In addition, each input micromirror in the input micromirror regions $I_{1,2}$, $I_{2,1}$, $I_{3,2}$, and $I_{4,1}$ can reflect the optical signal onto each output micromirror in the output micromirror regions $O_{2,1}$, $O_{1,2}$, $O_{4,1}$, and $O_{3,2}$. Therefore, the optical signals may be input through the input port 1, the input port 2, the input port 3, and the input port 4, and be output through the output port 2, the output port 1, the output port 4, and the output port 3 respectively.

For a case in which an optical signal is input through another input port and output through another output port, three times of transmission on an internal space path and two times of transmission on an external fiber path are required for the optical signal. For example, for a case in which an optical signal is input through the input port 3 and output through the output port 1, the input optical signal can arrive at the output micromirror region $O_{3,1}$ by means of deflection of an input micromirror, that is, by means of transmission on an internal space path. Then the optical signal can arrive at the input micromirror region $I_{5,1}$ through an external fiber, that is, by means of transmission on an external fiber path. Then the optical signal can arrive at the output micromirror region $O_{5,1}$ from the input micromirror region $I_{5,1}$ by means of transmission on the internal space path. Then the optical signal can arrive at the input micromirror region $I_{1,1}$ by means of transmission on the external fiber path. Therefore, the optical signal then can be transmitted to the output micromirror region $O_{1,2}$ from the input micromirror region $I_{1,1}$ by means of transmission on the internal space path, and output through the corresponding output port 1.

It should be understood that in this embodiment of the present invention, settings of the second input port and the second output port are described only by using the foregoing examples, but the present invention is not limited thereto. For example, the second input ports may also correspond to other input micromirror regions and the second output ports may also correspond to other output micromirror regions, provided that the input port 1 is adjacent to the input port 2, and the input port 3 is adjacent to the input port 4; correspondingly, the output port 1 is adjacent to the output port 2, and the output port 3 is adjacent to the output port 4.

In this embodiment of the present invention, optionally, the input micromirror regions $I_{i,1}$ and $I_{i,2}$ separately include L/2 input micromirrors, and the output micromirror regions $O_{i,1}$ and $O_{i,2}$ separately include L/2 output micromirrors, where L is an even number.

That is, in this embodiment of the present invention, a reflection area of an input micromirror region or an output micromirror region may be half of a reflection area of an entire input micromirror subarray or output micromirror subarray, but the present invention is not limited thereto. A ratio of the reflection area of the input micromirror region or the output micromirror region to the reflection area of the entire input micromirror subarray or output micromirror subarray may be another value such as ⅖ or ⅓.

In this embodiment of the present invention, optionally, each input micromirror subarray includes M input micromirrors, and each output micromirror subarray includes M output micromirrors, where M is a natural number. That is, a quantity of input micromirrors included in each input micromirror subarray is equal to a quantity of output micromirrors included in each output micromirror subarray.

However, it should be understood that this embodiment of the present invention is described only by using this as an example, and the present invention is not limited thereto. For example, a quantity of input micromirrors included in an input micromirror subarray may be equal to a quantity of output micromirrors included in a corresponding output micromirror subarray, but quantities of input micromirrors included in different input micromirror subarrays may not be equal. For another example, the quantity of input micromirrors included in each input micromirror subarray is not equal to the quantity of output micromirrors included in each output micromirror subarray.

This embodiment shown in FIG. 8 is still used as an example for description. The optical switch includes 6 input micromirror subarrays and 6 corresponding output micromirror subarrays. It is assumed that each input micromirror subarray includes two input micromirrors, and each output micromirror subarray includes two output micromirrors, that is, each input micromirror region and each output micromirror region includes one input micromirror and one output micromirror respectively. Therefore, as shown in FIG. 8, the optical switch includes 4 input ports, that is, input ports corresponding to input micromirrors that are included in the input micromirror regions $I_{1,2}$, $I_{2,1}$, $I_{3,2}$, and $I_{4,1}$ respectively; the optical switch further includes 4 output ports, that is, output ports corresponding to output micromirrors that are included in the output micromirror regions $O_{2,1}$, $O_{1,2}$, $O_{4,1}$, and $O_{3,2}$ respectively.

Therefore, in this embodiment of the present invention, a 4*4 optical switch may be constructed by using 6 2*2 optical switches, where a total quantity of input ports or output ports of the optical switch is 12 (that is, 4*3). However, if a 4*4 optical switch is constructed according to a completely nonblocking CLOS structure, 2 2*3 optical switches, 3 2*2 optical switches, and 2 3*2 optical switches are required. A total quantity of input ports or output ports of the optical switch in the CLOS structure is 16 (4*4). Therefore, a structure of the optical switch according to this embodiment of the present invention is superior to another purely-mathematical topological structure, and has higher port utilization, that is, relatively few ports may be used to implement expansion of the optical switch.

It should be understood that the foregoing example is described by using an example in which each micromirror subarray includes two micromirrors. If each micromirror subarray includes M micromirrors, in this embodiment of the present invention, a 2M*2M optical switch can be constructed by using an M*M optical switch. Especially when M is relatively large, a structure of the optical switch is superior to another purely-mathematical topological structure, and has higher port utilization, that is, relatively few ports may be used to implement expansion of the optical switch. For example, when M is 320, that is, an example of constructing a 640*640 optical switch by using a 320*320 optical switch is used for description, if a completely nonblocking CLOS structure is used, 640 2*3 optical switches and 3 320*320 optical switches are required, that is, a total quantity of input ports or output ports of the constructed optical switch in the CLOS structure is 640*4; if the optical switch in this embodiment of the present invention is used, a total quantity of input ports or output ports of the optical switch is 640*3. Therefore, the optical switch according to this embodiment of the present invention has higher port utilization. In addition, the optical switch constructed according to this embodiment of the present invention can also have completely nonblocking and full cross-connect features, and may be applied to a scenario in which a large-scale optical switch is required, such as a backbone network switching node or a data center.

Therefore, according to the optical switch in this embodiment of the present invention, the optical switch is designed as that maximum movable ranges of reflected light that is output after all input micromirrors reflect incident light with a same incident angle have no common intersection on a plane on which an output micromirror array is located; or maximum movable ranges of reflected light that is output after all input micromirrors reflect incident light with a same incident angle have a common intersection on a plane on which an output micromirror array is located, and an area of the common intersection is less than an area of a reflection region of the output micromirror array, which can implement a large-scale array, and therefore can meet a requirement of a switching node for a throughput capacity. In addition, the optical switch in this embodiment of the present invention further has relatively high port utilization, that is, relatively few ports may be used to implement expansion of the optical switch; therefore, the optical switch may be applied to a scenario in which a large-scale optical switch is required, such as a backbone network switching node or a data center.

Figure 9:
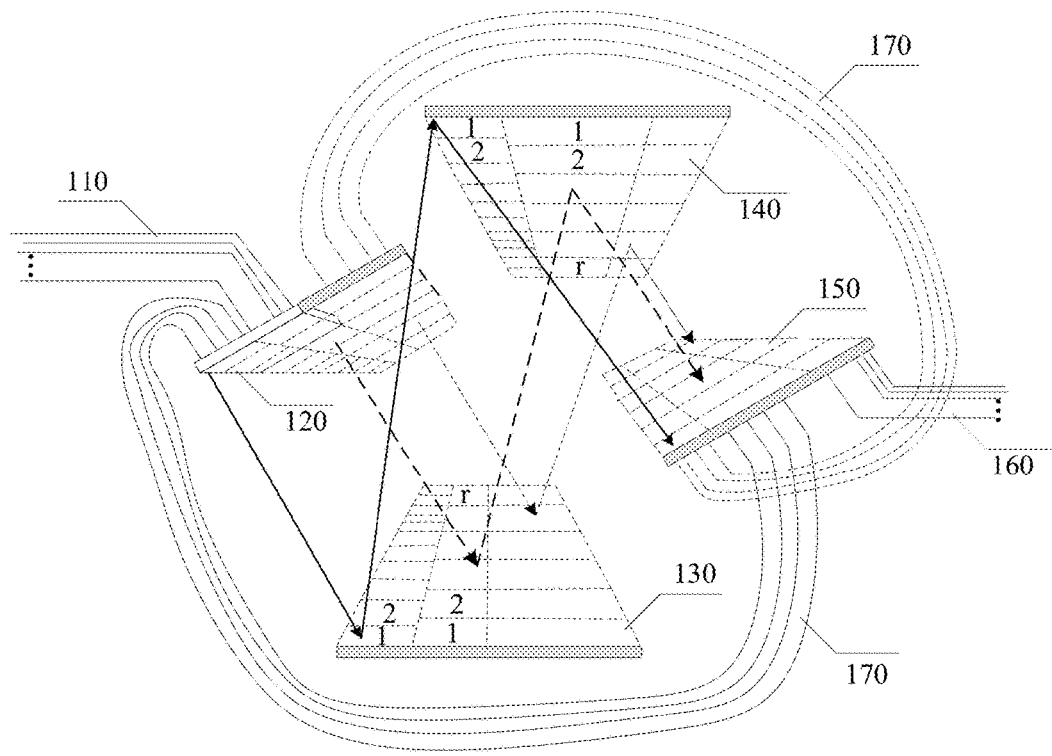
FIG. 9 is a schematic block diagram of an optical switch according to still another embodiment of the present invention.
Figure 10:
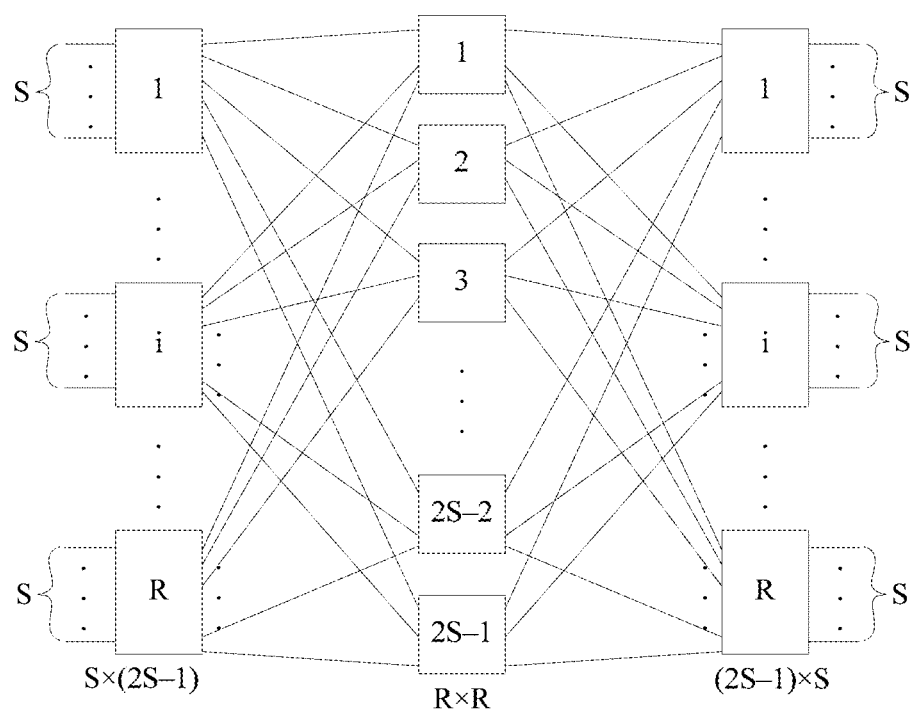
FIG. 10 is a schematic block diagram of a connection relationship between ports of an optical switch according to still another embodiment of the present invention.

In this embodiment of the present invention, as shown in FIG. 9 and FIG. 10, optionally, the $i^{th}$ input micromirror subarray including M input micromirrors and the $i^{th}$ output micromirror subarray including M output micromirrors form the $i^{th}$ micromirror subarray pair, and N micromirror subarray pairs include: R first micromirror subarray pairs, 2S−1 second micromirror subarray pairs, and R third micromirror subarray pairs, where R, S, and M are natural numbers, and 2R+2S−1=N.

Each first micromirror subarray pair corresponds to S input ports in the input port array and 2S−1 output ports in the output port array, each second micromirror subarray pair corresponds to R input ports in the input port array and R output ports in the output port array, and each third micromirror subarray pair corresponds to 2S−1 input ports in the input port array and S output ports in the output port array.

The $y^{th}$ output port $O^1_{x,y}$ corresponding to the $x^{th}$ first micromirror subarray pair and the $x^{th}$ input port $I^2_{y,x}$ corresponding to the $y^{th}$ second micromirror subarray pair are connected by using a fiber, and the $y^{th}$ input port $I^3_{x,y}$ corresponding to the $x^{th}$ third micromirror subarray pair and the $x^{th}$ output port $O^2_{y,x}$ corresponding to the $y^{th}$ second micromirror subarray pair are connected by using a fiber, where x and y are natural numbers, x=1, 2, . . . , and R, and y=1, 2, . . . , and 2S−1.

It should be understood that in the foregoing embodiment, the input micromirror array 130 includes N input micromirror subarrays, the output micromirror array 140 includes N output micromirror subarrays, and each input micromirror in the $i^{th}$ input micromirror subarray of the N input micromirror subarrays can reflect the optical signal onto each output micromirror in the $i^{th}$ output micromirror subarray of the N output micromirror subarrays, where N is a natural number, N≥2, and i=1, 2, . . . , and N. That is, in the foregoing embodiment, a micromirror subarray pair internally has a full cross-connect feature, that is, each input micromirror in the micromirror subarray pair can reflect the optical signal onto any output micromirror in the micromirror subarray pair.

It should be also understood that in this embodiment of the present invention, a connection relationship of ports among the first micromirror subarray pair, the second micromirror subarray pair, and the third micromirror subarray pair may be shown in FIG. 10. A connection between an input port and an output port or a connection between an output port and an input port may be implemented by using an external fiber 170, as shown by solid lines between ports in FIG. 10, but this embodiment of the present invention is not limited thereto.

According to the foregoing embodiment of the present invention, a large-scale, nonblocking, and fully cross-connected optical switch may be constructed and applied to a backbone network node or a data center. For example, it is assumed that a 25*25 optical switch may be produced according to a 3D-MEMS technological level. According to the solution in this embodiment of the present invention, a larger-scale and locally cross-connected optical switch may be produced, where 25 13*25 fully cross-connected port groups, 25 25*13 fully cross-connected port groups, and 25 25*25 fully cross-connected port groups are included. According to the solution described in this embodiment of the present invention, a fully cross-connected optical switch with scale of 325*325 may be formed. Therefore, in the solution, constructing a topological structure by using a locally cross-connected optical switch features higher integration and a smaller volume compared with constructing a topological structure by using an independent small-scale optical switch.

It should be also understood that cross scheduling time of a switching node is an important indicator in a WDM system. In a switching node based on a large-scale optical switch, cross scheduling time mainly depends on switching time of the optical switch, and the switching time of the optical switch is related to a deflection angle of a micromirror in a switching process. For the large-scale nonblocking optical switch constructed according to this embodiment of the present invention, full cross-connect is required to be implemented only inside a micromirror subarray pair, and it is unnecessary to implement full cross-connect of all ports within a range of the entire optical switch. Therefore, a deflection angle of a micromirror is less than that of a fully cross-connected optical switch of equivalent scale, and therefore switching time is shorter. Therefore, according to a switching node constructed by using a large-scale optical switch that is constructed according to this embodiment of the present invention, cross scheduling time is shorter.

Therefore, according to the optical switch in this embodiment of the present invention, the optical switch is designed as that maximum movable ranges of reflected light that is output after all input micromirrors reflect incident light with a same incident angle have no common intersection on a plane on which an output micromirror array is located; or maximum movable ranges of reflected light that is output after all input micromirrors reflect incident light with a same incident angle have a common intersection on a plane on which an output micromirror array is located, and an area of the common intersection is less than an area of a reflection region of the output micromirror array, which can implement a large-scale array, and therefore can meet a requirement of a switching node for a throughput capacity. In addition, the optical switch according to this embodiment of the present invention further has characteristics of higher integration, a small volume, and short switching time.

Figure 11:
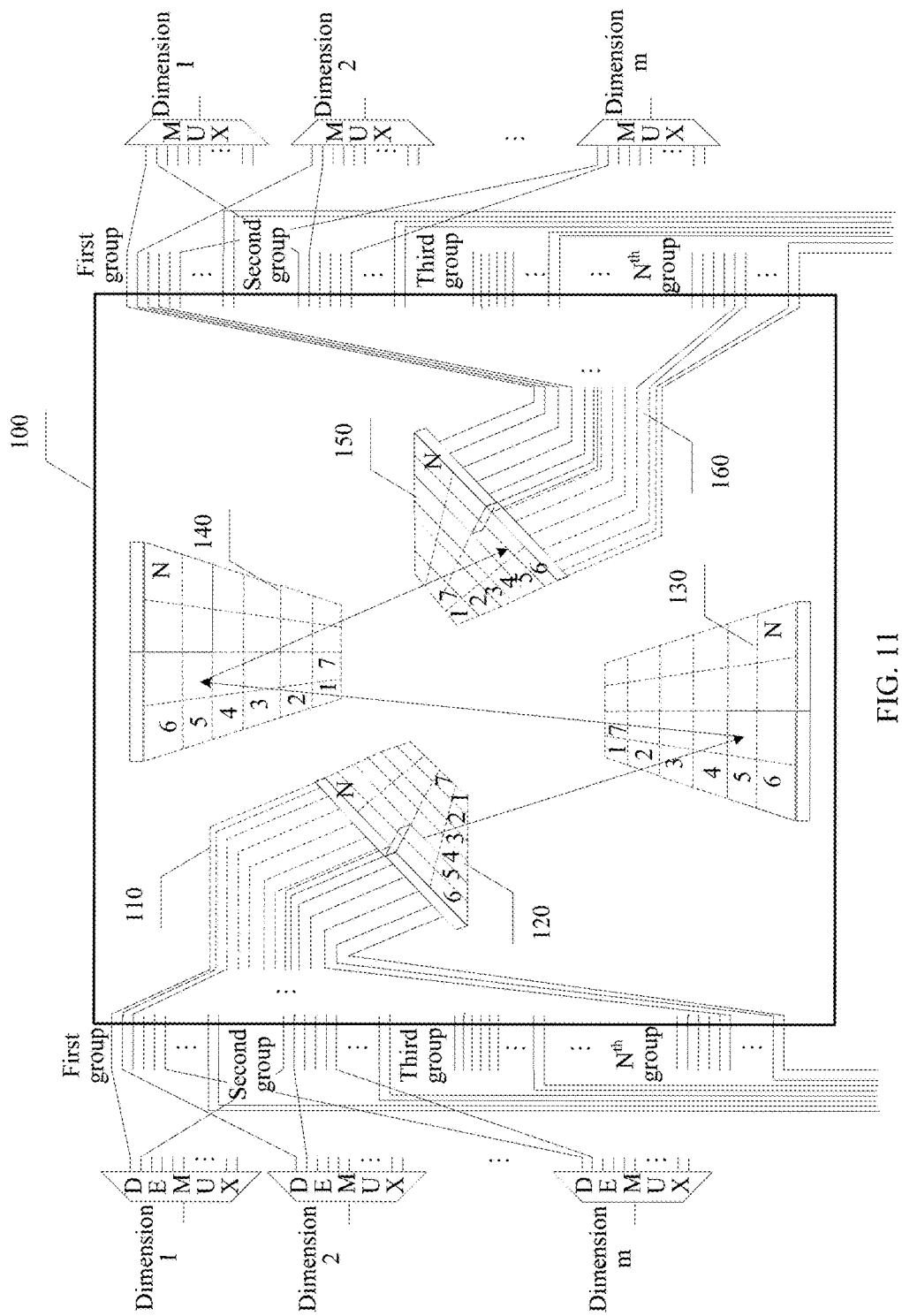
FIG. 11 is a schematic block diagram of a wavelength division multiplexing optical system according to an embodiment of the present invention.

According to another aspect, as shown in FIG. 11, an embodiment of the present invention further provides a wavelength division multiplexing optical system. The wavelength division multiplexing system includes the optical switch according to the foregoing embodiment of the present invention, m1 demultiplexers DEMUXes, and m2 multiplexers MUXes.

The optical switch includes: an input port array, an input collimator array connected to the input port array, an input micromirror array, an output micromirror array, an output collimator array, and an output port array connected to the output collimator array.

The input collimator array is configured to perform collimation and beam expansion on an optical signal input through the input port array, and make the optical signal, on which collimation and beam expansion have been performed, be incident on the input micromirror array. The input micromirror array is configured to reflect the optical signal, output by the input collimator array, onto the output micromirror array. The output micromirror array is configured to reflect the optical signal, reflected by the input micromirror array, onto the output collimator array. The output collimator array is configured to couple the optical signal, reflected by the output micromirror array, to the output port array.

All input micromirrors included in the input micromirror array can be deflected in two mutually perpendicular directions, and maximum movable ranges of reflected light that is output after all the input micromirrors reflect incident light with a same incident angle have no common intersection on a plane on which the output micromirror array is located; or maximum movable ranges of reflected light that is output after all the input micromirrors reflect incident light with a same incident angle have a common intersection on a plane on which the output micromirror array is located, and an area of the common intersection is less than an area of a reflection region of the output micromirror array.

The input micromirror array includes N input micromirror subarrays, the output micromirror array includes N output micromirror subarrays, and each input micromirror in the $i^{th}$ input micromirror subarray of the N input micromirror subarrays can reflect the optical signal onto each output micromirror in the $i^{th}$ output micromirror subarray of the N output micromirror subarrays, where N is a natural number, N≥2, and i=1, 2, . . . , and N.

The input port array 110 includes N input port subarrays, the input collimator array 120 includes N input collimator subarrays, the output port array 160 includes N output port subarrays, and the output collimator array 150 includes N output collimator subarrays, where each input port subarray corresponds to one input collimator subarray and one input micromirror subarray, and each output port subarray corresponds to one output collimator subarray and one output micromirror subarray.

Each input port subarray includes M1 input ports, each output port subarray includes M2 output ports, the $l1^{th}$ input port in the $i^{th}$ input port subarray is connected to a port that is of the $l1^{th}$ demultiplexer DEMUX of a wavelength division multiplexing WDM system and through which the $i^{th}$ wavelength-combined optical signal is output, and the $l2^{th}$ output port in the $i^{th}$ output port subarray is connected to a port that is of the $l2^{th}$ multiplexer MUX of the WDM system and through which the $i^{th}$ wavelength-combined optical signal is input, where M1, M2, l1, and l2 are natural numbers, l1=1, 2, . . . , and m1, l2=1, 2, . . . , and m2, 2≤m1≤M1, and 2≤m2≤M2.

Optionally, in this embodiment of the present invention, the input micromirror included in the input micromirror array and the output micromirror included in the output micromirror array are micro-electro-mechanical system MEMS micromirrors.

Optionally, in this embodiment of the present invention, the wavelength-combined optical signal includes at least two wavelengths.

Therefore, according to the wavelength division multiplexing optical system in this embodiment of the present invention, an optical switch included in the wavelength division multiplexing optical system is designed to include at least a first input micromirror subarray, a second input micromirror subarray, a third output micromirror subarray, and a fourth output micromirror subarray. Incident light can be incident within a reflection region of the third output micromirror subarray after being reflected by the first input micromirror subarray, and the incident light cannot be incident within a reflection region of the fourth output micromirror subarray after being reflected by the first input micromirror subarray. Incident light can be incident within the reflection region of the fourth output micromirror subarray after being reflected by the second input micromirror subarray. This can implement a large-scale array, and therefore can meet a requirement of a switching node for a throughput capacity.

It should be understood that in this embodiment of the present invention, optionally, quantities of the demultiplexers DEMUXes and the multiplexers MUXes included in the wavelength division multiplexing optical system are the same, that is, m1=m2. However, this embodiment of the present invention is not limited thereto, and the quantities of the DEMUXes and the MUXes may also be different, for example, m1>m2, or m2>m1.

It should be understood that features, structures, functions, and the like of some or all devices of the optical switch according to this embodiment of the present invention are the same as or similar to features, structures, and functions of corresponding devices of the optical switch 100 in the embodiment of the present invention shown in FIG. 1 to FIG. 10, and are not described herein again for brevity.

The following provides detailed description by using an example in which the optical switch according to this embodiment of the present invention is used for a switching node in a WDM system, and it is assumed that m1=m2=M and that M1=M2=M.

Specifically, an m-dimension and N-wavelength switching node in the WDM system is used as an example, as shown in FIG. 11. The input port array of the optical switch according to this embodiment of the present invention is divided into N input port subarrays, and a quantity of input ports included in each input port subarray is M; likewise, the output port array may be divided into N output port subarrays, and a quantity of output ports included in each output port subarray is M, where M is greater than or equal to m. Specially, if there is a local add/drop wavelength, the port quantity M is greater than m. After grouping is performed, an optical path connection may be established between any input port in each group and any output port in the group, that is, full cross-connect can be implemented for input and output ports in each group. In addition, some ports may also be scheduled to an adjacent group and some output ports in the adjacent group are used for output.

WDM light from m dimensions is divided into N different wavelengths by using the DEMUXes. λ1 of all the dimensions is respectively connected to input ports in the first input port subarray, so as to serve as the first wavelength-combined optical signal; λ2 of all the dimensions is respectively connected to input ports in the second input port subarray, so as to serve as the second wavelength-combined optical signal; other wavelengths of each dimension are successively connected to input ports in each input port subarray in such a manner. In this way, all λi from the m dimensions is connected to the $i^{th}$ input port subarray of the optical switch. An input port, of each MUX, for inputting λ1 is connected to an output port in the first output port subarray of the optical switch; an input port, of each MUX, for inputting λ2 is connected to an output port in the second output port subarray of the optical switch. Similarly, an input port, of each MUX, for inputting the $i^{th}$ wavelength-combined optical signal is connected to an output port in the $i^{th}$ output port subarray of the optical switch. Therefore, single-wavelength light output through output ports of the optical switch and destined for a same dimension is multiplexed into a fiber of the corresponding dimension by a MUX corresponding to the dimension, and is transmitted to a next switching node. If there are extra input/output ports in each input/output port subarray, these extra input ports are used for adding a local wavelength, and the extra output ports are used for dropping a local wavelength.

When a wavelength λc from a dimension a needs to be destined for a dimension b, a WDM signal from the dimension a is first demultiplexed as single-wavelength light by a DEMUX corresponding to the dimension a, and light λc of the $c^{th}$ wavelength is sent to an input port in the $c^{th}$ input port subarray of a locally cross-connected optical switch. According to the optical switch in this embodiment of the present invention, an optical path connection is established between the $a^{th}$ input port in the $c^{th}$ group and the $b^{th}$ output port in the $c^{th}$ group, and in this way, λc from the dimension a is sent to an output port corresponding to the dimension b in the $c^{th}$ output port subarray, where a, b, and c are natural numbers, a and b are less than or equal to m, and c is less than or equal to N. A MUX corresponding to the dimension b multiplexes λc output by the optical switch and other single-wavelength signals that need to be destined for the dimension b, and then outputs a multiplexed signal. In this way, wavelength scheduling is complete. The optical signal output after the multiplexing is sent to a corresponding single fiber, so as to be transmitted to a next switching node. In this way, wavelength-level scheduling between dimensions is complete on a current switching node.

When a local wavelength λc needs to be destined for a dimension a, λc is first sent to the optical switch by using an input port, reserved for adding, in the $c^{th}$ input port subarray of the optical switch, and then λc is sent to an output port corresponding to the dimension a in the $c^{th}$ output port subarray by means of scheduling between input and output ports in the $c^{th}$ group. A MUX corresponding to the dimension a multiplexes λc and other single-wavelength wavelengths destined for the dimension a, and sends a multiplexed signal to a fiber corresponding to the dimension a for transmission, thereby completing adding of the local wavelength.

When λc of a dimension b needs to be dropped, the input wavelength λc may be sent to an output port, reserved for dropping, in the $c^{th}$ output port subarray by means of scheduling between input and output ports in the $c^{th}$ group, thereby completing dropping of a local wavelength.

It should be understood that in this embodiment of the present invention, optionally, the wavelength-combined optical signal includes at least two wavelengths. For example, the wavelength-combined optical signal includes two or more wavelengths. Specifically, for the optical switch according to this embodiment of the present invention, it is not limited that each group of input and output ports only completes scheduling of one wavelength. For example, two-wavelength optical signals or multi-wavelength optical signals may also be scheduled in a same group. In this case, a port quantity in each group of ports should be greater than or equal to 2m or N*m. It should be also understood that in this embodiment of the present invention, the wavelength-combined optical signal may also include only one wavelength, and the present invention is not limited thereto. It should be also understood that in this embodiment of the present invention, description is provided only by using 2≤m as an example, but the present invention is not limited thereto, For example, a value of m may also be 1.

In this embodiment of the present invention, optionally, the input micromirror included in the input micromirror array 130 and the output micromirror included in the output micromirror array 140 are micro-electro-mechanical system MEMS micromirrors. However, the present invention is not limited thereto. For example, the input micromirror and the output micromirror according to this embodiment of the present invention may also be piezoceramics-based micromirrors, or the like.

In this embodiment of the present invention, a switching node accommodating 80 wavelengths of 8 dimensions and reserving 50% add/drop wavelengths is used as an example. In this case, if the node uses a fully cross-connected optical switch in the prior art as a switching device, a 960×960 optical switch is required. At present, an optical switch with maximum scale in the industry is produced based on a 3D-MEMS technology. However, limited to a 3D-MEMS micromirror technology, the 960×960 optical switch cannot be implemented.

However, if a structure of a locally cross-connected optical switch according to an embodiment of the present invention is used to produce such a 960*960 optical switch, a requirement can be satisfied if there are 12 input ports and 12 output ports in each group of fully cross-connected ports. Requirements of such a locally cross-connected optical switch and a 12×12 3D-MEMS optical switch for the 3D-MEMS technology are basically equivalent, and many device manufacturers in the industry have such a technology.

In this embodiment of the present invention, optionally, the $j^{th}$ input micromirror subarray of the input micromirror array includes an input adjacent region, and an input micromirror in the input adjacent region can reflect the optical signal onto an output micromirror in the $k^{th}$ output micromirror subarray, where the $k^{th}$ output micromirror subarray is adjacent to the $j^{th}$ output micromirror subarray, j and k are natural numbers, and j and k are less than or equal to N.

In this embodiment of the present invention, optionally, a first input port included in the input port array is connected, by using a fiber, to a first output port included in the output port array, so that the optical signal input through a second input port included in the input port array can be output through any second output port included in the output port array.

In this embodiment of the present invention, optionally, N is 6; the $i^{th}$ input micromirror subarray $I_i$ includes two input micromirror regions $I_{i,1}$ and $I_{i,2}$; the $i^{th}$ output micromirror subarray $O_i$ includes two output micromirror regions $O_{i,1}$ and $O_{i,2}$; each input micromirror in the input micromirror region $I_{1,2}$ can reflect the optical signal onto each output micromirror in the output micromirror region $O_{2,1}$; each input micromirror in $I_{2,1}$ adjacent to the input micromirror region $I_{1,2}$ can reflect the optical signal onto each output micromirror in $O_{1,2}$ adjacent to the output micromirror region $O_{2,1}$; each input micromirror in the input micromirror region $I_{3,2}$ can reflect the optical signal onto each output micromirror in the output micromirror region $O_{4,1}$; each input micromirror in $I_{4,1}$ adjacent to the input micromirror region $I_{3,2}$ can reflect the optical signal onto each output micromirror in $O_{3,2}$ adjacent to the output micromirror region $O_{4,1}$; and first input ports corresponding to the input micromirror regions $I_{1,1}, I_{2,2}, I_{3,1}, I_{4,2}, I_{5,1}, I_{5,2}, I_{6,1}$ and $I_{6,2}$ are respectively connected to first output ports corresponding to the output micromirror regions $O_{5,1}, O_{5,2}, O_{6,1}, O_{6,2}, O_{3,1}, O_{4,2}, O_{1,1},$ and $O_{2,2}$ by using fibers.

In this embodiment of the present invention, optionally, the input micromirror regions $I_{i,1}$ and $I_{i,2}$ separately include L/2 input micromirrors, and the output micromirror regions $O_{i,1}$ and $O_{i,2}$ separately include L/2 output micromirrors, where L is an even number.

In this embodiment of the present invention, optionally, each input micromirror subarray includes M input micromirrors, and each output micromirror subarray includes M output micromirrors, where M is a natural number.

In this embodiment of the present invention, optionally, the $i^{th}$ input micromirror subarray including M input micromirrors and the $i^{th}$ output micromirror subarray including M output micromirrors form the $i^{th}$ micromirror subarray pair, and N micromirror subarray pairs include: R first micromirror subarray pairs, 2S−1 second micromirror subarray pairs, and R third micromirror subarray pairs, where R, S, and M are natural numbers, and 2R+2S−1=N.

Each first micromirror subarray pair corresponds to S input ports in the input port array and 2S−1 output ports in the output port array, each second micromirror subarray pair corresponds to R input ports in the input port array and R output ports in the output port array, and each third micromirror subarray pair corresponds to 2S−1 input ports in the input port array and S output ports in the output port array.

The $y^{th}$ output port $O^1_{x,y}$ corresponding to the $x^{th}$ first micromirror subarray pair and the $x^{th}$ input port $I^2_{y,x}$ corresponding to the $y^{th}$ second micromirror subarray pair are connected by using a fiber, and the $y^{th}$ input port $I^3_{x,y}$ corresponding to the $x^{th}$ third micromirror subarray pair and the $x^{th}$ output port $O^2_{y,x}$ corresponding to the $y^{th}$ second micromirror subarray pair are connected by using a fiber, where x and y are natural numbers, x=1, 2, . . . , and R, and y=1, 2, . . . , and 2S−1.

Therefore, according to the wavelength division multiplexing optical system in this embodiment of the present invention, an optical switch included in the wavelength division multiplexing optical system is designed to include at least a first input micromirror subarray, a second input micromirror subarray, a third output micromirror subarray, and a fourth output micromirror subarray. Incident light can be incident within a reflection region of the third output micromirror subarray after being reflected by the first input micromirror subarray, and the incident light cannot be incident within a reflection region of the fourth output micromirror subarray after being reflected by the first input micromirror subarray. Incident light can be incident within the reflection region of the fourth output micromirror subarray after being reflected by the second input micromirror subarray. This can implement a large-scale array, and therefore can meet a requirement of a switching node for a throughput capacity.

According to still another aspect, an embodiment of the present invention provides an optical switch. The optical switch includes: an input port array, an input collimator array connected to the input port array, an input micromirror array, an output micromirror array, an output collimator array, and an output port array connected to the output collimator array.

The input collimator array is configured to perform collimation and beam expansion on an optical signal input through the input port array, and make the optical signal, on which collimation and beam expansion have been performed, be incident on the input micromirror array.

The input micromirror array is configured to reflect the optical signal, output by the input collimator array, onto the output micromirror array.

The output micromirror array is configured to reflect the optical signal, reflected by the input micromirror array, onto the output collimator array.

The output collimator array is configured to couple the optical signal, reflected by the output micromirror array, to the output port array.

All input micromirrors included in the input micromirror array can be deflected in two mutually perpendicular directions. The input micromirror array includes at least a first input micromirror subarray and a second input micromirror subarray, and the output micromirror array includes at least a third output micromirror subarray and a fourth output micromirror subarray. Incident light can be incident within a reflection region of the third output micromirror subarray after being reflected by the first input micromirror subarray, and the incident light cannot be incident within a reflection region of the fourth output micromirror subarray after being reflected by the first input micromirror subarray. Incident light can be incident within the reflection region of the fourth output micromirror subarray after being reflected by the second input micromirror subarray.

In this embodiment of the present invention, optionally, the input micromirror array includes N input micromirror subarrays, the output micromirror array includes N output micromirror subarrays, and each input micromirror in the $i^{th}$ input micromirror subarray of the N input micromirror subarrays can reflect the optical signal onto each output micromirror in the $i^{th}$ output micromirror subarray of the N output micromirror subarrays, where N is a natural number, N≥2, and i=1, 2, . . . , and N.

Specifically, in this embodiment of the present invention, each input micromirror in the first input micromirror subarray can reflect incident light onto each output micromirror in the third output micromirror subarray; each input micromirror in the second input micromirror subarray can reflect incident light onto each output micromirror in the fourth output micromirror subarray. However, each input micromirror in the first input micromirror subarray cannot reflect incident light onto any output micromirror in the fourth output micromirror subarray.

That is, in this embodiment of the present invention, optionally, the first input micromirror subarray is configured to reflect incident light, incident on any input micromirror in the first input micromirror subarray, onto any output micromirror in the third output micromirror subarray, but not configured to reflect the incident light onto any output micromirror in the fourth output micromirror subarray. Similarly, the second input micromirror subarray is configured to reflect incident light, incident on any input micromirror in the second input micromirror subarray, onto any output micromirror in the fourth output micromirror subarray.

It should be also understood that features, structures, functions, and the like of some or all devices of the optical switch according to this embodiment of the present invention are the same as or similar to features, structures, and functions of corresponding devices of the optical switch 100 in the embodiment of the present invention shown in FIG. 1 to FIG. 4, and are not described herein again for brevity.

Therefore, according to the optical switch in this embodiment of the present invention, the optical switch is designed to include at least a first input micromirror subarray, a second input micromirror subarray, a third output micromirror subarray, and a fourth output micromirror subarray. Incident light can be incident within a reflection region of the third output micromirror subarray after being reflected by the first input micromirror subarray, and the incident light cannot be incident within a reflection region of the fourth output micromirror subarray after being reflected by the first input micromirror subarray. Incident light can be incident within the reflection region of the fourth output micromirror subarray after being reflected by the second input micromirror subarray. This can implement a large-scale array, and therefore can meet a requirement of a switching node for a throughput capacity.

In this embodiment of the present invention, optionally, the output micromirror array further includes a fifth output micromirror subarray, and the incident light can also be incident within a reflection region of the fifth output micromirror subarray after being reflected by the first input micromirror subarray, where the third output micromirror subarray and the fifth output micromirror subarray are adjacent micromirror arrays.

It should be understood that in this embodiment of the present invention, for example, the output micromirror array may further include the fifth output micromirror subarray adjacent to the third output micromirror subarray, and the input micromirror array may further include a sixth input micromirror subarray. The first input micromirror subarray corresponds to the third output micromirror subarray, the second input micromirror subarray corresponds to the fourth output micromirror subarray, and the fifth output micromirror subarray corresponds to the sixth input micromirror subarray. That is, each input micromirror in the sixth input micromirror subarray can reflect incident light onto each output micromirror in the fifth output micromirror subarray. Each input micromirror in the first input micromirror subarray can further reflect incident light onto each output micromirror in the fifth output micromirror subarray.

That is, in this embodiment of the present invention, the first input micromirror subarray is configured to reflect incident light, incident on any input micromirror in the first input micromirror subarray, onto any output micromirror in the third or fifth output micromirror subarray, where the third output micromirror subarray and the fifth output micromirror subarray are adjacent micromirror arrays.

It should be also understood that features, structures, functions, and the like of some or all devices of the optical switch according to this embodiment of the present invention are the same as or similar to features, structures, and functions of corresponding devices of the optical switch 100 in the embodiment of the present invention shown in FIG. 5, and are not described herein again for brevity.

In this embodiment of the present invention, optionally, a first input port included in the input port array is connected, by using a fiber, to a first output port included in the output port array, so that the optical signal input through a second input port included in the input port array can be output through any second output port included in the output port array.

It should be understood that in this embodiment of the present invention, the first input port indicates an input port that is in the input port array and connected to an output port by using a fiber, and correspondingly, the first output port indicates an output port that is in the output port array and connected to an input port by using a fiber; the second input port indicates an input port that is in the input port array and not connected to an output port by using a fiber, that is, an input port in the input port array except the first input port, and correspondingly, the second output port indicates an output port that is in the output port array and not connected to an input port by using a fiber, that is, an output port in the output port array except the first output port.

It should be also understood that features, structures, functions, and the like of some or all devices of the optical switch according to this embodiment of the present invention are the same as or similar to features, structures, and functions of corresponding devices of the optical switch 100 in the embodiment of the present invention shown in FIG. 6, and are not described herein again for brevity.

In this embodiment of the present invention, optionally, the input micromirror array includes N input micromirror subarrays, and the $i^{th}$ input micromirror subarray of the N input micromirror subarrays includes two input micromirror subregions $I_{i,1}$ and $I_{i,2}$; the output micromirror array includes N output micromirror subarrays, and the $i^{th}$ output micromirror subarray of the N output micromirror subarrays includes two output micromirror subregions $O_{i,1}$ and $O_{i,2}$; each input micromirror in the input micromirror subregion $I_{4,2}$ can reflect the optical signal onto each output micromirror in the output micromirror subregion $O_{2,1}$; each input micromirror in $I_{2,1}$ adjacent to the input micromirror subregion $I_{1,2}$ can reflect the optical signal onto each output micromirror in $O_{1,2}$ adjacent to the output micromirror subregion $O_{2,1}$; each input micromirror in the input micromirror subregion $I_{3,2}$ can reflect the optical signal onto each output micromirror in the output micromirror subregion $O_{4,1}$; and each input micromirror in $I_{4,1}$ adjacent to the input micromirror subregion $I_{3,2}$ can reflect the optical signal onto each output micromirror in $O_{3,2}$ adjacent to the output micromirror subregion $O_{4,1}$, where first input ports corresponding to the input micromirror subregions $I_{1,1}$, $I_{2,2}$, $I_{3,1}$, $I_{4,2}$, $I_{5,1}$, $I_{5,2}$, $I_{6,1}$, and $I_{6,2}$ respectively connected to first output ports corresponding to the output micromirror subregions $O_{5,1}$, $O_{5,2}$, $O_{6,1}$, $O_{6,2}$, $O_{3,1}$, $O_{4,2}$, $O_{1,1}$, and $O_{2,2}$ by using fibers, and N=6.

It should be also understood that features, structures, functions, and the like of some or all devices of the optical switch according to this embodiment of the present invention are the same as or similar to features, structures, and functions of corresponding devices of the optical switch 100 in the embodiment of the present invention shown in FIG. 7 and FIG. 8, and are not described herein again for brevity.

In this embodiment of the present invention, optionally, the input micromirror subregions $I_{i,1}$ and $I_{i,2}$ separately include L/2 input micromirrors, and the output micromirror subregions $O_{i,1}$ and $O_{i,2}$ separately include L/2 output micromirrors, where L is an even number.

In this embodiment of the present invention, optionally, each input micromirror subarray includes M input micromirrors, and each output micromirror subarray includes M output micromirrors, where M is a natural number.

Therefore, according to the optical switch in this embodiment of the present invention, the optical switch is designed to include at least a first input micromirror subarray, a second input micromirror subarray, a third output micromirror subarray, and a fourth output micromirror subarray. Incident light can be incident within a reflection region of the third output micromirror subarray after being reflected by the first input micromirror subarray, and the incident light cannot be incident within a reflection region of the fourth output micromirror subarray after being reflected by the first input micromirror subarray. Incident light can be incident within the reflection region of the fourth output micromirror subarray after being reflected by the second input micromirror subarray. This can implement a large-scale array, and therefore can meet a requirement of a switching node for a throughput capacity. In addition, the optical switch in this embodiment of the present invention further has relatively high port utilization, that is, relatively few ports may be used to implement expansion of the optical switch; therefore, the optical switch may be applied to a scenario in which a large-scale optical switch is required, such as a backbone network switching node or a data center.

In this embodiment of the present invention, optionally, the $i^{th}$ input micromirror subarray including M input micromirrors and the $i^{th}$ output micromirror subarray including M output micromirrors form the $i^{th}$ micromirror subarray pair, and N micromirror subarray pairs include: R first micromirror subarray pairs, 2S−1 second micromirror subarray pairs, and R third micromirror subarray pairs, where R, S, and M are natural numbers, and 2R+2S−1=N.

Each first micromirror subarray pair corresponds to S input ports in the input port array and 2S−1 output ports in the output port array, each second micromirror subarray pair corresponds to R input ports in the input port array and R output ports in the output port array, and each third micromirror subarray pair corresponds to 2S−1 input ports in the input port array and S output ports in the output port array.

The $y^{th}$ output port $O^1_{x,y}$ corresponding to the $x^{th}$ first micromirror subarray pair and the $x^{th}$ input port $I^2_{y,x}$ corresponding to the $y^{th}$ second micromirror subarray pair are connected by using a fiber, and the $y^{th}$ input port $I^3_{x,y}$ corresponding to the $x^{th}$ third micromirror subarray pair and the $x^{th}$ output port $O^2_{y,x}$ corresponding to the $y^{th}$ second micromirror subarray pair are connected by using a fiber, where x and y are natural numbers, x=1, 2, . . . , and R, and y=1, 2, . . . , and 2S−1.

In this embodiment of the present invention, optionally, the input micromirror included in the input micromirror array and the output micromirror included in the output micromirror array are micro-electro-mechanical system MEMS micromirrors.

It should be also understood that features, structures, functions, and the like of some or all devices of the optical switch according to this embodiment of the present invention are the same as or similar to features, structures, and functions of corresponding devices of the optical switch 100 in the embodiment of the present invention shown in FIG. 9 and FIG. 10, and are not described herein again for brevity.

It should be also understood that cross scheduling time of a switching node is an important indicator in a WDM system. In a switching node based on a large-scale optical switch, cross scheduling time mainly depends on switching time of the optical switch, and the switching time of the optical switch is related to a deflection angle of a micromirror in a switching process. For the large-scale nonblocking optical switch constructed according to this embodiment of the present invention, full cross-connect is required to be implemented only inside a micromirror subarray pair, and it is unnecessary to implement full cross-connect of all ports within a range of the entire optical switch. Therefore, a deflection angle of a micromirror is less than that of a fully cross-connected optical switch of equivalent scale, and therefore switching time is shorter. Therefore, according to a switching node constructed by using a large-scale optical switch that is constructed according to this embodiment of the present invention, cross scheduling time is shorter.

Therefore, according to the optical switch in this embodiment of the present invention, the optical switch is designed to include at least a first input micromirror subarray, a second input micromirror subarray, a third output micromirror subarray, and a fourth output micromirror subarray. Incident light can be incident within a reflection region of the third output micromirror subarray after being reflected by the first input micromirror subarray, and the incident light cannot be incident within a reflection region of the fourth output micromirror subarray after being reflected by the first input micromirror subarray. Incident light can be incident within the reflection region of the fourth output micromirror subarray after being reflected by the second input micromirror subarray. This can implement a large-scale array, and therefore can meet a requirement of a switching node for a throughput capacity. In addition, the optical switch according to this embodiment of the present invention further has characteristics of higher integration, a small volume, and short switching time.

An embodiment of the present invention further provides a wavelength division multiplexing optical system. The wavelength division multiplexing optical system includes the optical switch according to the foregoing embodiment of the present invention, m1 demultiplexers DEMUXes, and m2 multiplexers MUXes.

The input port array includes N input port subarrays, the input collimator array includes N input collimator subarrays, the output port array includes N output port subarrays, and the output collimator array includes N output collimator subarrays, where each input port subarray corresponds to one input collimator subarray and one input micromirror subarray, and each output port subarray corresponds to one output collimator subarray and one output micromirror subarray.

Each input port subarray includes M1 input ports, each output port subarray includes M2 output ports, the $11^{th}$ input port in the $i^{th}$ input port subarray is connected to a port that is of the $12^{th}$ demultiplexer DEMUX of a wavelength division multiplexing WDM system and through which the $i^{th}$ wavelength-combined optical signal is output, and the $12^{th}$ output port in the $i^{th}$ output port subarray is connected to a port that is of the $12^{th}$ multiplexer MUX of the WDM system and through which the $i^{th}$ wavelength-combined optical signal is input, where M1, M2, l1, and l2 are natural numbers, l1=1, 2, . . . , and m1, l2=1, 2, . . . , and m2, 2≤m1≤M1, and 2≤m2≤M2.

The optical switch includes: an input port array, an input collimator array connected to the input port array, an input micromirror array, an output micromirror array, an output collimator array, and an output port array connected to the output collimator array.

The input collimator array is configured to perform collimation and beam expansion on an optical signal input through the input port array, and make the optical signal, on which collimation and beam expansion have been performed, be incident on the input micromirror array. The input micromirror array is configured to reflect the optical signal, output by the input collimator array, onto the output micromirror array. The output micromirror array is configured to reflect the optical signal, reflected by the input micromirror array, onto the output collimator array. The output collimator array is configured to couple the optical signal, reflected by the output micromirror array, to the output port array.

All input micromirrors included in the input micromirror array can be deflected in two mutually perpendicular directions. The input micromirror array includes at least a first input micromirror subarray and a second input micromirror subarray, and the output micromirror array includes at least a third output micromirror subarray and a fourth output micromirror subarray. Incident light can be incident within a reflection region of the third output micromirror subarray after being reflected by the first input micromirror subarray, and the incident light cannot be incident within a reflection region of the fourth output micromirror subarray after being reflected by the first input micromirror subarray. Incident light can be incident within the reflection region of the fourth output micromirror subarray after being reflected by the second input micromirror subarray.

The input micromirror array includes N input micromirror subarrays, the output micromirror array includes N output micromirror subarrays, and each input micromirror in the $i^{th}$ input micromirror subarray of the N input micromirror subarrays can reflect the optical signal onto each output micromirror in the $i^{th}$ output micromirror subarray of the N output micromirror subarrays, where N is a natural number, N≥2, and i=1, 2, . . . , and N.

The input micromirror included in the input micromirror array and the output micromirror included in the output micromirror array are micro-electro-mechanical system MEMS micromirrors.

It should be understood that in this embodiment of the present invention, optionally, quantities of the demultiplexers DEMUXes and the multiplexers MUXes included in the wavelength division multiplexing optical system are the same, that is, m1=m2. However, this embodiment of the present invention is not limited thereto, and the quantities of the DEMUXes and the MUXes may also be different, for example, m1>m2, or m2>m1.

It should be also understood that features, structures, functions, and the like of some or all devices of the wavelength division multiplexing optical system according to this embodiment of the present invention are the same as or similar to features, structures, and functions of corresponding devices of the wavelength division multiplexing optical system in the embodiment of the present invention shown in FIG. 11, and are not described herein again for brevity.

In this embodiment of the present invention, optionally, the wavelength-combined optical signal includes at least two wavelengths.

In this embodiment of the present invention, optionally, the output micromirror array further includes a fifth output micromirror subarray, and the incident light can also be incident within a reflection region of the fifth output micromirror subarray after being reflected by the first input micromirror subarray, where the third output micromirror subarray and the fifth output micromirror subarray are adjacent micromirror arrays.

In this embodiment of the present invention, optionally, a first input port included in the input port array is connected, by using a fiber, to a first output port included in the output port array, so that the optical signal input through a second input port included in the input port array can be output through any second output port included in the output port array.

In this embodiment of the present invention, optionally, the input micromirror array includes N input micromirror subarrays, and the $i^{th}$ input micromirror subarray of the N input micromirror subarrays includes two input micromirror subregions $I_{i,1}$ and $I_{i,2}$; the output micromirror array includes N output micromirror subarrays, and the $i^{th}$ output micromirror subarray of the N output micromirror subarrays includes two output micromirror subregions $O_{i,1}$ and $O_{i,2}$; each input micromirror in the input micromirror subregion $I_{1,2}$ can reflect the optical signal onto each output micromirror in the output micromirror subregion $O_{2,1}$; each input micromirror in $I_{2,1}$ adjacent to the input micromirror subregion $I_{1,2}$ can reflect the optical signal onto each output micromirror in $O_{1,2}$ adjacent to the output micromirror subregion $O_{2,1}$; each input micromirror in the input micromirror subregion $I_{3,2}$ can reflect the optical signal onto each output micromirror in the output micromirror subregion $O_{4,1}$; and each input micromirror in $I_{4,1}$ adjacent to the input micromirror subregion $I_{3,2}$ can reflect the optical signal onto each output micromirror in $O_{3,2}$ adjacent to the output micromirror subregion $O_{4,1}$, where first input ports corresponding to the input micromirror subregions $I_{1,1}$, $I_{2,2}$, $I_{3,1}$, $I_{4,2}$, $I_{5,1}$, $I_{5,2}$, $I_{6,1}$, and $I_{6,1}$ are respectively connected to first output ports corresponding to the output micromirror subregions $O_{5,1}$, $O_{5,2}$, $O_{6,1}$, $O_{6,2}$, $O_{3,1}$, $O_{4,2}$, $O_{1,1}$, and $O_{2,2}$ by using fibers, and N=6.

In this embodiment of the present invention, optionally, the input micromirror subregions $I_{i,1}$ and $I_{i,2}$ separately include L/2 input micromirrors, and the output micromirror subregions $O_{i,1}$ and $O_{i,2}$ separately include L/2 output micromirrors, where L is an even number.

In this embodiment of the present invention, optionally, each input micromirror subarray includes M input micromirrors, and each output micromirror subarray includes M output micromirrors, where M is a natural number.

In this embodiment of the present invention, optionally, the $i^{th}$ input micromirror subarray including M input micromirrors and the $i^{th}$ output micromirror subarray including M output micromirrors form the $i^{th}$ micromirror subarray pair, and N micromirror subarray pairs include: R first micromirror subarray pairs, 2S−1 second micromirror subarray pairs, and R third micromirror subarray pairs, where R, S, and M are natural numbers, and 2R+2S−1=N.

Each first micromirror subarray pair corresponds to S input ports in the input port array and 2S−1 output ports in the output port array, each second micromirror subarray pair corresponds to R input ports in the input port array and R output ports in the output port array, and each third micromirror subarray pair corresponds to 2S−1 input ports in the input port array and S output ports in the output port array.

The $y^{th}$ output port $O^1_{x,y}$ corresponding to the $x^{th}$ first micromirror subarray pair and the $x^{th}$ input port $I^2_{y,x}$ corresponding to the $y^{th}$ second micromirror subarray pair are connected by using a fiber, and the $y^{th}$ input port $I^3_{x,y}$ corresponding to the $x^{th}$ third micromirror subarray pair and the $x^{th}$ output port $O^2_{y,x}$ corresponding to the $y^{th}$ second micromirror subarray pair are connected by using a fiber, where x and y are natural numbers, x=1, 2, ..., and R, and y=1, 2, ..., and 2S−1.

It should be also understood that the optical switch included in the wavelength division multiplexing optical system according to this embodiment of the present invention may correspond to the optical switch 100 according to the embodiment of the present invention. Moreover, features, structures, functions, and the like of some or all devices of the optical switch included in the wavelength division multiplexing optical system are the same as or similar to features, structures, and functions of corresponding devices of the optical switch 100 in the embodiment of the present invention, and are not described herein again for brevity.

Therefore, according to the wavelength division multiplexing optical system in this embodiment of the present invention, an optical switch of the wavelength division multiplexing optical system is designed to include at least a first input micromirror subarray, a second input micromirror subarray, a third output micromirror subarray, and a fourth output micromirror subarray. Incident light can be incident within a reflection region of the third output micromirror subarray after being reflected by the first input micromirror subarray, and the incident light cannot be incident within a reflection region of the fourth output micromirror subarray after being reflected by the first input micromirror subarray. Incident light can be incident within the reflection region of the fourth output micromirror subarray after being reflected by the second input micromirror subarray. This can implement a large-scale array, and therefore can meet a requirement of a switching node for a throughput capacity.

In addition, an embodiment of the present invention further provides an optical switch array. The optical switch array includes multiple optical switches according to the embodiments of the present invention. The optical switch includes: an input port, an input collimator array connected to the input port, an input micromirror array, an output micromirror array, an output collimator array, and an output port connected to the output collimator array.

The input collimator array is configured to perform collimation and beam expansion on an optical signal input through the input port, and make the optical signal, on which collimation and beam expansion have been performed, be incident on the input micromirror array. The input micromirror array is configured to reflect the optical signal, output by the input collimator array, onto the output micromirror array. The output micromirror array is configured to reflect the optical signal, reflected by the input micromirror array, onto the output collimator array. The output collimator array is configured to couple the optical signal, reflected by the output micromirror array, to the output port.

All input micromirrors included in the input micromirror array can be deflected in two mutually perpendicular directions, and maximum movable ranges of reflected light that is output after all the input micromirrors reflect incident light with a same incident angle have no common intersection on a plane on which the output micromirror array is located; or maximum movable ranges of reflected light that is output after all the input micromirrors reflect incident light with a same incident angle have a common intersection on a plane on which the output micromirror array is located, and an area of the common intersection is less than an area of a reflection region of the output micromirror array.

Therefore, according to the optical switch array in this embodiment of the present invention, an optical switch included in the optical switch array is designed as that maximum movable ranges of reflected light that is output after all input micromirrors reflect incident light with a same incident angle have no common intersection on a plane on which an output micromirror array is located; or maximum movable ranges of reflected light that is output after all input micromirrors reflect incident light with a same incident angle have a common intersection on a plane on which an output micromirror array is located, and an area of the common intersection is less than an area of a reflection region of the output micromirror array, which can implement a large-scale array, and therefore can meet a requirement of a switching node for a throughput capacity.

It should be understood that terms "system" and "network" in this specification may be often used interchangeably in this specification. A term "and/or" in this specification is merely used to describe an association relationship of associated objects, which means that three relationships may exist, for example, A and/or B may mean that only A exists, both A and B exist, or only B exists. In addition, a character "/" in this specification generally indicates an "or" relationship between contextually associated objects.

It should be also understood that in the embodiments of the present invention, "B corresponding to A" indicates that B and A are associated, and B can be determined according to A. However, it should be also understood that determining B according to A does not mean that B is determined only according to A, and B may be alternatively determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An optical switch comprising:
    an input port array;
    an input collimator array connected to the input port array;
    an input micromirror array;
    an output micromirror array;
    an output collimator array; and
    an output port array connected to the output collimator array,
    wherein the input collimator array is configured to perform collimation and beam expansion on an optical input signal through the input port array, and make the optical signal, on which collimation and beam expansion have been performed, be incident on the input micromirror array,
    wherein the input micromirror array is configured to reflect the optical signal, output by the input collimator array, onto the output micromirror array,
    wherein the output micromirror array is configured to reflect the optical signal, reflected by the input micromirror array, onto the output collimator array,
    wherein the output collimator array is configured to couple the optical signal, reflected by the output micromirror array, to the output port array,
    wherein all input micromirrors of the input micromirror array are deflectable in two mutually perpendicular directions; and
    wherein an area of a reflection region of the input micromirror array is greater than a preset value, such that maximum moving ranges of reflected light that is output after all the input micromirrors reflect incident light with the same incident angle pass through separate and different regions of a plane on which the output micromirror array is located, or
    maximum moving ranges of reflected light that is output after all the input micromirrors reflect incident light with the same incident angle have a common intersection on the plane on which the output micromirror array is located, and an area of a reflection region of the output micromirror array is greater than an area of the common intersection.

2. The optical switch according to claim 1, wherein the input micromirror array comprises N input micromirror subarrays, wherein the output micromirror array comprises N output micromirror subarrays, each input micromirror in an ith input micromirror subarray of the N input micromirror subarrays can reflect the optical signal onto each output micromirror in an ith output micromirror subarray of the N output micromirror subarrays, and wherein N is a natural number, $N \geq 2$, and $i=1, 2, \ldots ,$ and N.

3. The optical switch according to claim 2, wherein a jth input micromirror subarray of the input micromirror array comprises an input adjacent region, and an input micromirror in the input adjacent region can reflect the optical signal onto an output micromirror in a kth output micromirror subarray, wherein the kth output micromirror subarray is adjacent to a jth output micromirror subarray, j and k are natural numbers, and j and k are less than or equal to N.

4. The optical switch according to claim 2, wherein a first input port of the input port array is connected, by an optical fiber, to a first output port of the output port array so that the optical signal input through a second input port of the input port array can be output through any second output port of the output port array.

5. The optical switch according to claim 4, wherein N is 6; the ith input micromirror subarray Ii comprises two input micromirror regions Ii,1 and Ii,2; the ith output micromirror subarray Oi comprises two output micromirror regions Oi,1 and Oi, 2; each input micromirror in the input micromirror region I1,2 can reflect the optical signal onto each output micromirror in the output micromirror region O2,1; each input micromirror in I2,1 adjacent to the input micromirror region I1,2 can reflect the optical signal onto each output micromirror in O1,2 adjacent to the output micromirror region O2,1; each input micromirror in an input micromirror region I3,2 can reflect the optical signal onto each output micromirror in the output micromirror region O4,1; each input micromirror in I4,1 adjacent to the input micromirror region I3,2 can reflect the optical signal onto each output micromirror in O3,2 adjacent to the output micromirror region O4,1; and first input ports corresponding to the input micromirror regions I1,1, I2,2, I3,1, I4,2, I5,1, I5,2, I6,1 and I6,2 are respectively connected to first output ports corresponding to output micromirror regions O5,1, O5,2, O6,1, O6,2, O3,1, O4,2, O1,1, and O2,2 by using optical fibers.

6. The optical switch according to claim 5, wherein the input micromirror regions Ii,1 and Ii,2 separately comprise L/2 input micromirrors, and the output micromirror regions Oi,1 and Oi,2 separately comprise L/2 output micromirrors, and wherein L is an even number.

7. The optical switch according to claim 2, wherein each input micromirror subarray comprises M input micromirrors, and each output micromirror subarray comprises M output micromirrors, and wherein M is a natural number.

8. The optical switch according to claim 2, wherein the ith input micromirror subarray comprising M input micromirrors and the ith output micromirror subarray comprising M output micromirrors forming an ith micromirror subarray pair, and N micromirror subarray pairs comprise: R first micromirror subarray pairs, 2S−1 second micromirror subarray pairs, and R third micromirror subarray pairs, wherein R, S, and M are natural numbers, and 2R+2S−1=N, wherein each first micromirror subarray pair corresponds to S input ports in the input port array and 2S−1 output ports in the output port array, each second micromirror subarray pair corresponds to R input ports in the input port array and R output ports in the output port array, and each third micromirror subarray pair corresponds to 2S−1 input ports in the input port array and S output ports in the output port array, and wherein a yth output port O1x,y corresponding to an xth first micromirror subarray pair and an xth input port I2y,x corresponding to a yth second micromirror subarray pair are connected by a optical fiber, and an yth input port I3x,y corresponding to an xth third micromirror subarray pair and an xth output port O2y,x corresponding to a yth second micromirror subarray pair are connected by optical fiber, and wherein x and y are natural numbers, x=1, 2, . . . , and R, and y=1, 2, . . . , and 2S−1.

9. A wavelength division multiplexing optical system, the system comprising:
the optical switch according to claim 1;
m1 demultiplexers; and
m2 multiplexers,
wherein the input port array comprises N input port subarrays, the input collimator array comprises N input collimator subarrays, the output port array comprises N output port subarrays, and the output collimator array comprises N output collimator subarrays, wherein each input port subarray corresponds to one input collimator subarray and one input micromirror subarray, and each output port subarray corresponds to one output collimator subarray and one output micromirror subarray, and
wherein each input port subarray comprises M1 input ports, each output port subarray comprises M2 output ports, a l1th input port in an ith input port subarray is connected to a port that is of a l1th demultiplexer of a wavelength division multiplexing WDM system and through which an ith wavelength-combined optical signal is output, and a l2th output port in an ith output port subarray is connected to a port that is a l2th multiplexer of the WDM system and through which the ith wavelength-combined optical signal is input, and wherein M1, M2, l1, and l2 are natural numbers, l1=1, 2, . . . , and m1, l2=1, 2, . . . , and m2, 2 ≤m1≤M1, and 2≤m2≤M2.

10. The wavelength division multiplexing optical system according to claim 9, wherein the wavelength-combined optical signal comprises at least two wavelengths.

11. An optical switch comprising:
an input port array;
an input collimator array connected to the input port array;
an input micromirror array;
an output micromirror array;
an output collimator array; and
an output port array connected to the output collimator array,
wherein the input collimator array is configured to perform collimation and beam expansion on an optical signal input through the input port array, and make the optical signal, on which collimation and beam expansion have been performed, be incident on the input micromirror array,
wherein the input micromirror array is configured to reflect the optical signal, output by the input collimator array, onto the output micromirror array,
wherein the output micromirror array is configured to reflect the optical signal, reflected by the input micromirror array, onto the output collimator array,
wherein the output collimator array is configured to couple the optical signal, reflected by the output micromirror array, to the output port array,
wherein all input micromirrors of the input micromirror array are deflectable in two mutually perpendicular directions,
wherein an area of a reflection region of the output micromirror array is greater than a common intersection of maximum moving ranges of reflected light that is output after all the input micromirrors reflect incident light with the same incident angle on a plane on which the output micromirror array is located,
wherein the input micromirror array comprises at least a first input micromirror subarray and a second input micromirror subarray, and the output micromirror array comprises at least a third output micromirror subarray and a fourth output micromirror subarray,
wherein incident light is incident within a reflection region of the third output micromirror subarray after being reflected by the first input micromirror subarray, and the incident light cannot be incident within a reflection region of the fourth output micromirror subarray after being reflected by the first input micromirror subarray, and
wherein incident light is incident within the reflection region of the fourth output micromirror subarray after being reflected by the second input micromirror subarray.

12. The optical switch according to claim ii, wherein the input micromirror array comprises N input micromirror subarrays, wherein the output micromirror array comprises N output micromirror subarrays, and wherein each input micromirror in an ith input micromirror subarray of the N input micromirror subarrays can reflect the optical signal onto each output micromirror in an ith output micromirror subarray of the N output micromirror subarrays, an wherein N is a natural number, N ≥2, and i=1 2, . . . , and N.

13. The optical switch according to claim 12, wherein the output micromirror array further comprises a fifth output micromirror subarray, and the incident light can also be incident within a reflection region of the fifth output micromirror subarray after being reflected by the first input micromirror subarray, and wherein the third output micromirror subarray and the fifth output micromirror subarray are adjacent micromirror arrays.

14. The optical switch according to claim 12, wherein a first input port of the input port array is connected, by an optical fiber, to a first output port of the output port array so that the optical signal input through a second input port of the input port array can be output through any second output port of the output port array.

15. The optical switch according to claim 14, wherein the input micromirror array comprises N input micromirror subarrays, and the ith input micromirror subarray of the N input micromirror subarrays comprises two input micromirror subregions Ii,1 and Ii,2; the output micromirror array comprises N output micromirror subarrays, and the ith output micromirror subarray of the N output micromirror subarrays comprises two output micromirror subregions $O_{i,1}$ and $O_{i,2}$; each input micromirror in the input micromirror subregion $I1,2$ can reflect the optical signal onto each output micromirror in the output micromirror subregion $O2,1$; each input micromirror in $I2,1$ adjacent to the input micromirror subregion $I1,2$ can reflect the optical signal onto each output micromirror in $O1,2$ adjacent to the output micromirror subregion $O2,1$; each input micromirror in an input micromirror subregion $I3,2$ can reflect the optical signal onto each output micromirror in the output micromirror subregion $O4,1$; and each input micromirror in $I4,1$ adjacent to the input micromirror subregion $I3,2$ can reflect the optical signal onto each output micromirror in $O3,2$ adjacent to the output micromirror subregion $O4,1$, wherein first input ports corresponding to the input micromirror subregions $I1,1$, $I2,2$, $I3,1$, $I4,2$, $I5,1$, $I5,2$, $I6,1$, and $I6,2$ are respectively connected to first output ports corresponding to output micromirror subregions $O5,1$, $O5,2$, $O6,1$, $O6,2$, $O3,1$, $O4,2$, $O1,1$, and $O2,2$ by using optical fibers, and $N=6$.

16. The optical switch according to claim 15, wherein the input micromirror subregions $I_{i,i}$ and $I_{i,2}$ separately comprise $L/2$ input micromirrors, wherein the output micromirror subregions $O_{i,1}$ and $O_{i,2}$ separately comprise $L/2$ output micromirrors, and wherein L is an even number.

17. The optical switch according to claim 12, wherein each input micromirror subarray comprises M input micromirrors, and each output micromirror subarray comprises M output micromirrors, and wherein M is a natural number.

18. The optical switch according to claim 12, wherein the ith input micromirror subarray comprising M input micromirrors and the ith output micromirror subarray comprising M output micromirrors form an ith micromirror subarray pair, and N micromirror subarray pairs comprise: R first micromirror subarray pairs, $2S-1$ second micromirror subarray pairs, and R third micromirror subarray pairs, wherein R, S, and M are natural numbers, and $2R+2S-1=N$, wherein each first micromirror subarray pair corresponds to S input ports in the input port array and $2S-1$ output ports in the output port array, each second micromirror subarray pair corresponds to R input ports in the input port array and R output ports in the output port array, and each third micromirror subarray pair corresponds to $2S-1$ input ports in the input port array and S output ports in the output port array, and wherein an yth output port $O1_{x,y}$ corresponding to an xth first micromirror subarray pair and an xth input port $I2_{y,x}$ corresponding to an yth second micromirror subarray pair are connected by using a optical fiber, and an yth input port $I3_{x,y}$ corresponding to an xth third micromirror subarray pair and an xth output port $O2_{y,x}$ corresponding to an yth second micromirror subarray pair are connected by using a optical fiber, wherein x and y are natural numbers, $x=1, 2, \ldots$, and R, and $y=1, 2, \ldots$, and $2S-1$.

19. A wavelength division multiplexing optical system, the system comprising:

the optical switch according to claim 11;

m1 demultiplexers; and m2 multiplexers, wherein the input port array comprises N input port subarrays, the input collimator array comprises N input collimator subarrays, the output port array comprises N output port subarrays, and the output collimator array comprises N output collimator subarrays, wherein each input port subarray corresponds to one input collimator subarray and one input micromirror subarray, and each output port subarray corresponds to one output collimator subarray and one output micromirror subarray, and wherein each input port subarray comprises M1 input ports, each output port subarray comprises M2 output ports, an l1th input port in an ith input port subarray is connected to a port that is of an l1th demultiplexer of a wavelength division multiplexing WDM system and through which an ith wavelength-combined optical signal is output, and a l2th output port in an ith output port subarray is connected to a port that is of a l2th multiplexer of the WDM system and through which the ith wavelength-combined optical signal is input, wherein M1, M2, l1, and l2 are natural numbers, $l1=1, 2, \ldots$, and m1, $l2=1, 2, \ldots$, and m2, $2 \ m1 \leq M1$, and $2 \ m2 \leq M2$.

20. The wavelength division multiplexing optical system according to claim 19, wherein the wavelength-combined optical signal comprises at least two wavelengths.

\* \* \* \* \*

UNITED STATES PATENT AND TRADEMARK OFFICE
CERTIFICATE OF CORRECTION

PATENT NO.        : 10,031,294 B2
APPLICATION NO.   : 15/360642
DATED             : July 24, 2018
INVENTOR(S)       : Zhang It is certified that error appears in the above-identified patent and that said Letters Patent is hereby corrected as shown below:

In Column 37, Line 4, Claim 8, delete "2S—-1" and insert --2S–1--.

In Column 38, Line 38, Claim 12, delete "claim ii" and insert --claim 11--.

In Column 38, Lines 45-46, Claim 12, delete "an wherein N is a natural number, $N \geq 2$, and i=1 2, ..., and N" and insert --and wherein N is a natural number, $N \geq 2$, and i=1, 2, ..., and N--.

In Column 39, Line 21, Claim 16, delete "Ii,i" and insert --Ii,1--.

In Column 40, Lines 38-39, Claim 19, delete "and m1,12=1, 2, ..., and m2, 2 m1 $\leq$ M1, and 2 m2 $\leq$ M2" and insert --and m1, l2=1, 2, ..., and m2, $2 \leq m1 \leq M1$, and $2 \leq m2 \leq M2$--.

Signed and Sealed this
Ninth Day of October, 2018

Andrei Iancu
*Director of the United States Patent and Trademark Office*